United States Patent
Davydov et al.

(10) Patent No.: US 11,641,299 B2
(45) Date of Patent: May 2, 2023

(54) PHASE TRACKING REFERENCE SIGNAL (PT-RS) CONFIGURATION

(71) Applicant: Apple Inc., Cupertino, CA (US)

(72) Inventors: Alexei Vladimirovich Davydov, Nizhny Novgorod (RU); Guotong Wang, Beijing (CN); Gang Xiong, Beaverton, OR (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 274 days.

(21) Appl. No.: 16/645,360

(22) PCT Filed: Sep. 6, 2018

(86) PCT No.: PCT/US2018/049745
§ 371 (c)(1),
(2) Date: Mar. 6, 2020

(87) PCT Pub. No.: WO2019/051085
PCT Pub. Date: Mar. 14, 2019

(65) Prior Publication Data
US 2021/0168011 A1    Jun. 3, 2021

Related U.S. Application Data

(60) Provisional application No. 62/587,910, filed on Nov. 17, 2017.

(30) Foreign Application Priority Data

Sep. 7, 2017  (WO) ............... PCT/CN2017/100926
Nov. 15, 2017 (WO) ............... PCT/CN2017/111058

(51) Int. Cl.
*H04L 27/26* (2006.01)
*H04L 1/00* (2006.01)
(Continued)

(52) U.S. Cl.
CPC ........ *H04L 27/2613* (2013.01); *H04L 1/0003* (2013.01); *H04L 1/1819* (2013.01);
(Continued)

(58) Field of Classification Search
CPC ........... H04L 27/26134; H04L 27/2636; H04L 1/003; H04L 27/2675; H04L 5/0048;
(Continued)

(56) References Cited

U.S. PATENT DOCUMENTS 10,411,861 B2 *  9/2019  Lee ........................ H04L 5/001
10,447,319 B1 * 10/2019  Lee ..................... H04B 7/0473
(Continued)

OTHER PUBLICATIONS

Nokia et al., "Discussion on PT-RS Design for CP-OFDM", 3GPP Draft, R1-1711308, vol. RAN WG1, Jun. 26, 2017, Qingdao, China, 10 pgs.
(Continued)

*Primary Examiner* — Man U Phan
(74) *Attorney, Agent, or Firm* — Kowert, Hood, Munyon, Rankin & Goetzel, P.C.

(57) ABSTRACT

A user equipment (UE) can include processing circuitry configured to decode downlink control information (DCI) from a base station, the DCI including a modulation coding scheme (MCS) index and physical uplink shared channel (PUSCH) allocation. A demodulation reference signal (DM-RS) is encoded for transmission to the base station within a plurality of DM-RS symbols based on the PUSCH allocation. A phase tracking reference signal (PT-RS) time domain density is determined based on the MCS index and a number count of the DM-RS symbols for the DM-RS transmission. The PT-RS is encoded for transmission using a plurality of PT-RS symbols based on the determined time domain den-
(Continued)

sity. The plurality of symbols includes one or both of front-loaded DM-RS symbols and additional DM-RS symbols.

20 Claims, 29 Drawing Sheets

(51) Int. Cl.
*H04L 1/1812* (2023.01)
*H04L 5/00* (2006.01)
*H04W 72/04* (2023.01)

(52) U.S. Cl.
CPC .......... *H04L 5/0044* (2013.01); *H04L 5/0048* (2013.01); *H04L 5/0064* (2013.01); *H04L 27/2675* (2013.01); *H04W 72/042* (2013.01); *H04L 5/0007* (2013.01); *H04L 27/2636* (2013.01); *H04L 27/26134* (2021.01)

(58) Field of Classification Search
CPC ... H04L 1/1819; H04L 5/0044; H04L 5/0053; H04L 27/2613; H04L 1/0025; H04L 5/0064; H04L 27/26; H04L 5/0007; H04L 1/18; H04L 5/00; H04L 1/00; H04J 11/005; H04W 72/042; H04W 72/04
USPC ......................................................... 370/350
See application file for complete search history.

(56) References Cited

U.S. PATENT DOCUMENTS

| | | | | |
|---|---|---|---|---|
| 10,727,998 | B2* | 7/2020 | Zhang | H04L 5/0098 |
| 11,012,191 | B2* | 5/2021 | Sun | H04L 1/06 |
| 11,018,920 | B2* | 5/2021 | Saito | H04L 27/2621 |
| 11,082,150 | B2* | 8/2021 | Xu | H04L 5/0007 |
| 11,108,605 | B2* | 8/2021 | Zhang | H04L 5/0048 |
| 11,153,900 | B2* | 10/2021 | Kim | H04W 72/1289 |
| 11,201,764 | B2* | 12/2021 | Zhang | H04L 25/0226 |
| 11,277,238 | B2* | 3/2022 | Chen | H04L 27/26 |
| 2016/0006594 | A1 | 1/2016 | Persson et al. | |
| 2020/0186311 | A1* | 6/2020 | Xu | H04L 27/2613 |
| 2020/0244415 | A1* | 7/2020 | Liu | H04L 1/0003 |
| 2022/0006560 | A1* | 1/2022 | Xu | H04L 5/006 |

OTHER PUBLICATIONS

Spreadtrum Communications, "Considerations on PT-RS for CP-OFDM", 3GPP Draft, R1-1710363, vol. RAN WG1, Jun. 26, 2017, Qingdao, China, 6 pgs.
Vivo, "Discussion on PTRS Design", 3GPP Draft, R1-1707248, vol. RAN WG1, May 14, 2017, Hangzhou, China, 6 pgs.
European Search Report for Application No. EP18854754.1, dated Dec. 8, 2020, 11 pgs.
International Search Report and Written Opinion for International Application No. PCT/US2018/049745, dated Jan. 18, 2019, 9 pages.
National Instruments, 'Discussion on explicit and implicit signaling for PT-RS', R1-1708272, 3GPP TSG RAN WG1 Meeting #89, Hangzhou, P.R. China, May 5, 2017 See pp. 4-7; and tables 1-2.
Qualcomm Incorporated, 'UL PTRS considerations', R1-1713411, 3GPP TSG RAN WG1 #90, Prague, Czech Republic, Aug. 12, 2017 See p. 1.
LG Electronics, 'On DL PT-RS design', R1-1710296, 3GPP TSG RAN WG1 Meeting NR AH #2, Qingdao, P.R. China, Jun. 17, 2017 See p. 1.
Mitsubishi Electric, 'UL PTRS for DFTsOFDM waveform', R1-1710230, 3GPP TSG RAN WG1 Meeting NR AH #2, Qingdao, P.R. China, Jun. 16, 2017 See section 3.
Nokia et al., 'On the PT-RS design for DFT-s-OFDM', R1-1708931, 3GPP TSG RAN WG1 Meeting #89, Hangzhou, P.R. China, May 6, 2017 See sections 1-3.
Ericsson, 'Summary of PTRS open issues and companies views', R1-1707803, 3GPP TSG RAN WG1 Meeting #89, Hangzhou, P.R. China, May 17, 2017 See sections 1-3.

* cited by examiner

PHASE TRACKING REFERENCE SIGNAL (PT-RS) CONFIGURATION

PRIORITY CLAIM

This application claims the benefit of priority to the following applications: PCT Application Serial No. PCT/CN2017/100926, filed Sep. 7, 2017, and entitled "PHASE TRACKING REFERENCE SIGNAL CONFIGURATION;" PCT Application Serial No. PCT/CN2017/111058, filed Nov. 15, 2017, and entitled "PHASE TRACKING REFERENCE SIGNAL (PTRS) PATTERN IN ADAPTIVE HYBRID AUTOMATIC REPEAT REQUEST (HARQ);" and U.S. Provisional Patent Application Ser. No. 62/587,910, filed Nov. 17, 2017, and entitled "RESOURCE MAPPING OF PHASE TRACKING REFERENCE SIGNAL (PT-RS)."

Each of the above-identified patent applications is incorporated. herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for phase tracking reference signal (PT-RS) configuration. Additional aspects are directed to PT-RS pattern configuration in adaptive hybrid automatic repeat request (HARQ) process. Yet other aspects are directed to resource mapping of PT-RS.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming, and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address configuration of PT-RS, including determining PT-RS time domain and frequency domain density as well as resource mapping for PT-RS.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
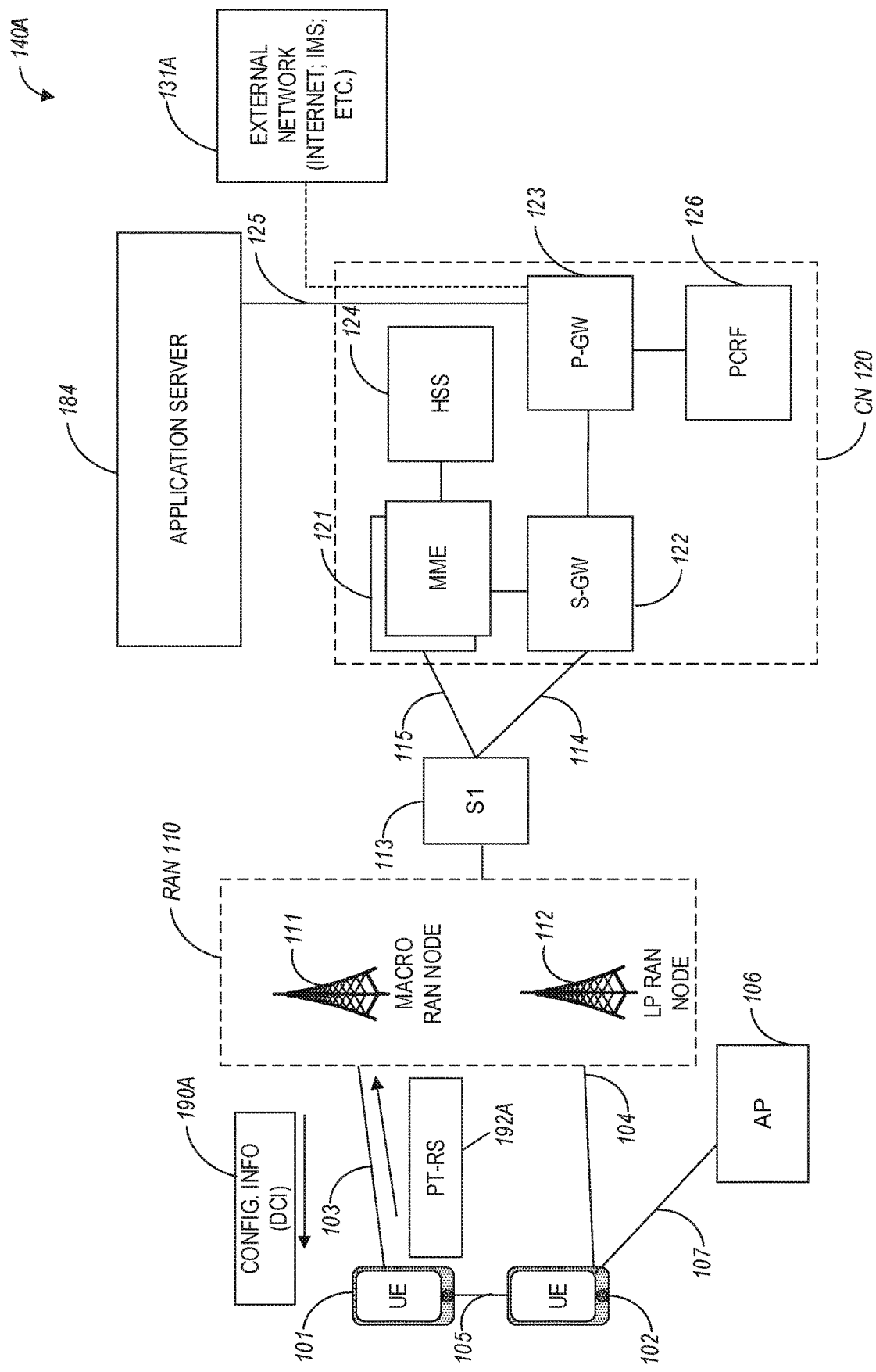
FIG. 1A illustrates an architecture of a network in accordance with some aspects.

FIG. 1A illustrates an architecture of a network in accordance with some aspects. The network 140A is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

Any of the radio links described herein (e.g., as used in the network 140A or any other illustrated network) may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third. Generation (3G), Circuit Switched Data (CSD), High-Speed Circuit-Switched Data (HSC SD), Universal Mobile Telecommunications System (Third Generation) (UMTS (3G)), Wideband Code Division Multiple Access (Universal Mobile Telecommunications System) (W-CDMA (UNITS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted. Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), improved Mobile Telephone System (INITS), Advanced Mobile Telephone System (AMTS), OLT (Norwegian for Offentlig Landmobil Telefoni, Public Land Mobile Telephony), CIoTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched. Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11 ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single LTE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced. LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHZ and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHZ and 700 MHZ bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM. SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT IJE can utilize technologies such as machine-to-machine (M2M) or machine-type communications (MTC) for exchanging data with an CIoTC server or device via a public land mobile network (PLMN), Proximity-Based Service (ProSe) or device-to-device (D2D) communication, sensor networks, or IoT networks. The M2M or CIoTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced CIoTC (eMTC) UEs or further enhanced CIoTC (FeMTC) UEs.

The UEs 101 and 102 may be configured to connect, es., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the LTEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MME's 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate a SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PDSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network.

In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can receive configuration information 190A via, e.g., higher layer signaling or other types of signaling. The configuration information 190A can downlink control information (DCI) with information that can be used for configuring PT-RS as disclosed herein below. In response to the configuration information, the UE 101 can communicate PT-RS information 192A back to the gNB 111, as described herein below.

Figure 1B:
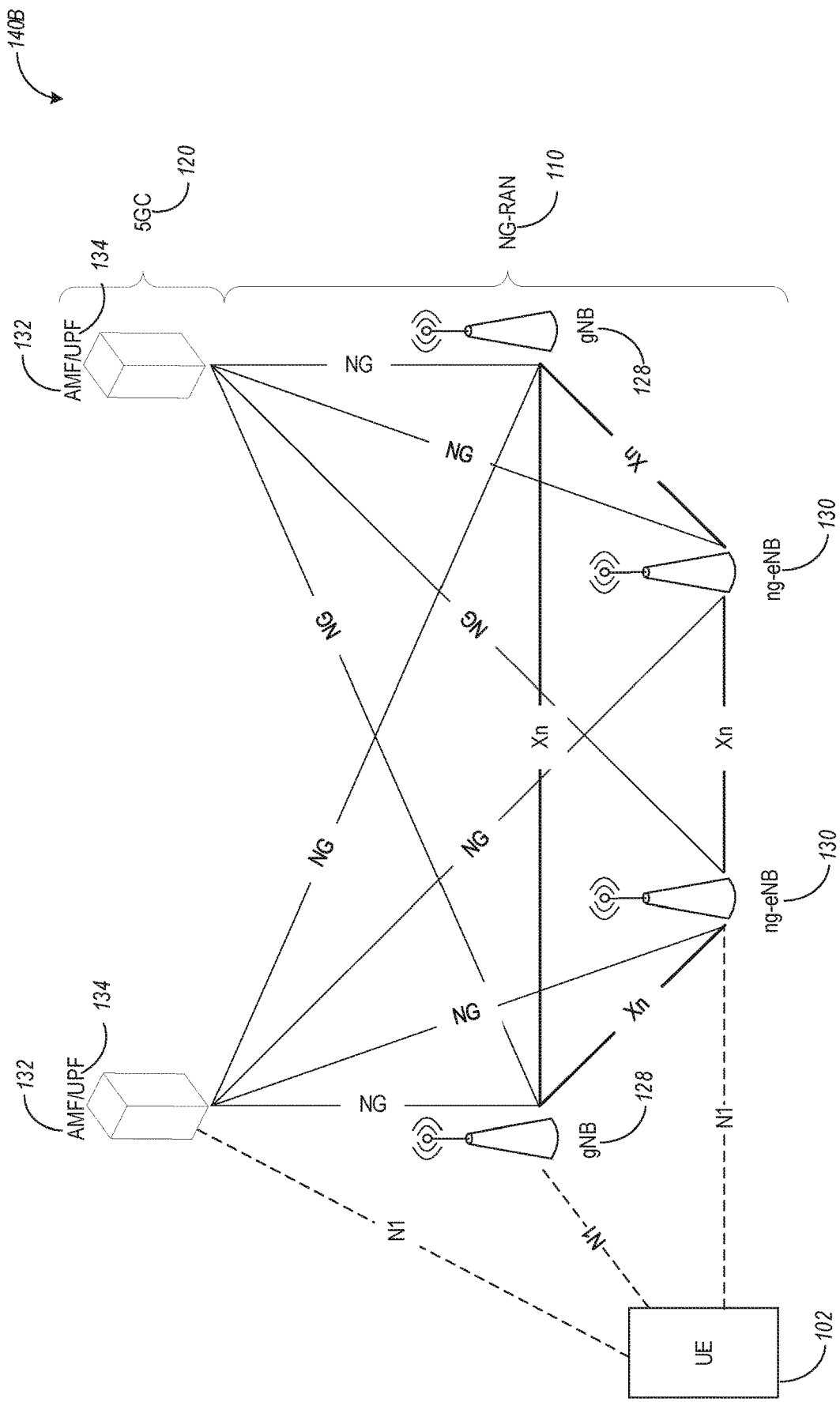
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via. Xn interfaces.

In some aspects, a gNB 128 can include a node providing new radio (NR) user plane and control plane protocol termination towards the UE, and is connected via the NG interface to the 5GC 120. In some aspects, an NG-eNB 130 can include a node providing evolved universal terrestrial radio access (E-UTRA) user plane and control plane protocol terminations towards the UE, and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
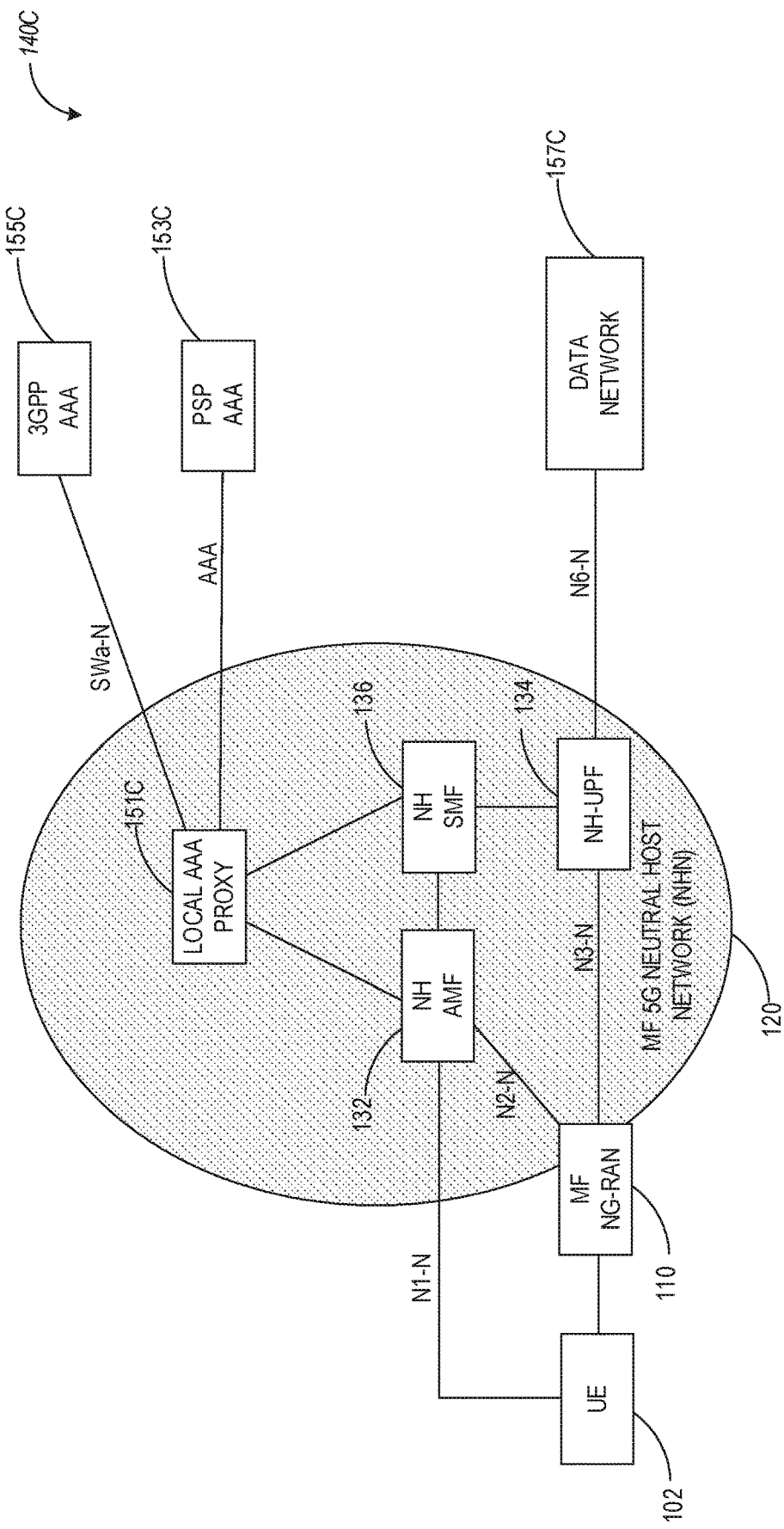
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and core network 120. The NG-RAN 110 can be a MulteFire NG-RAN (MF NG-RAN), and the core network 120 can be a MulteFire 5G neutral host network (NHN).

In some aspects, the MF NHN 120 can include a neutral host AMF (NH AMF) 132, a NFI SMF 136, a NFI UPF 134, and a local AAA proxy 151C. The AAA proxy 151C can provide connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as a AMF in a 3GPP 5G core network (e.g., as described in reference to FIG. 1D). The NH-SMF 136 can be configured to provide similar functionality as a SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
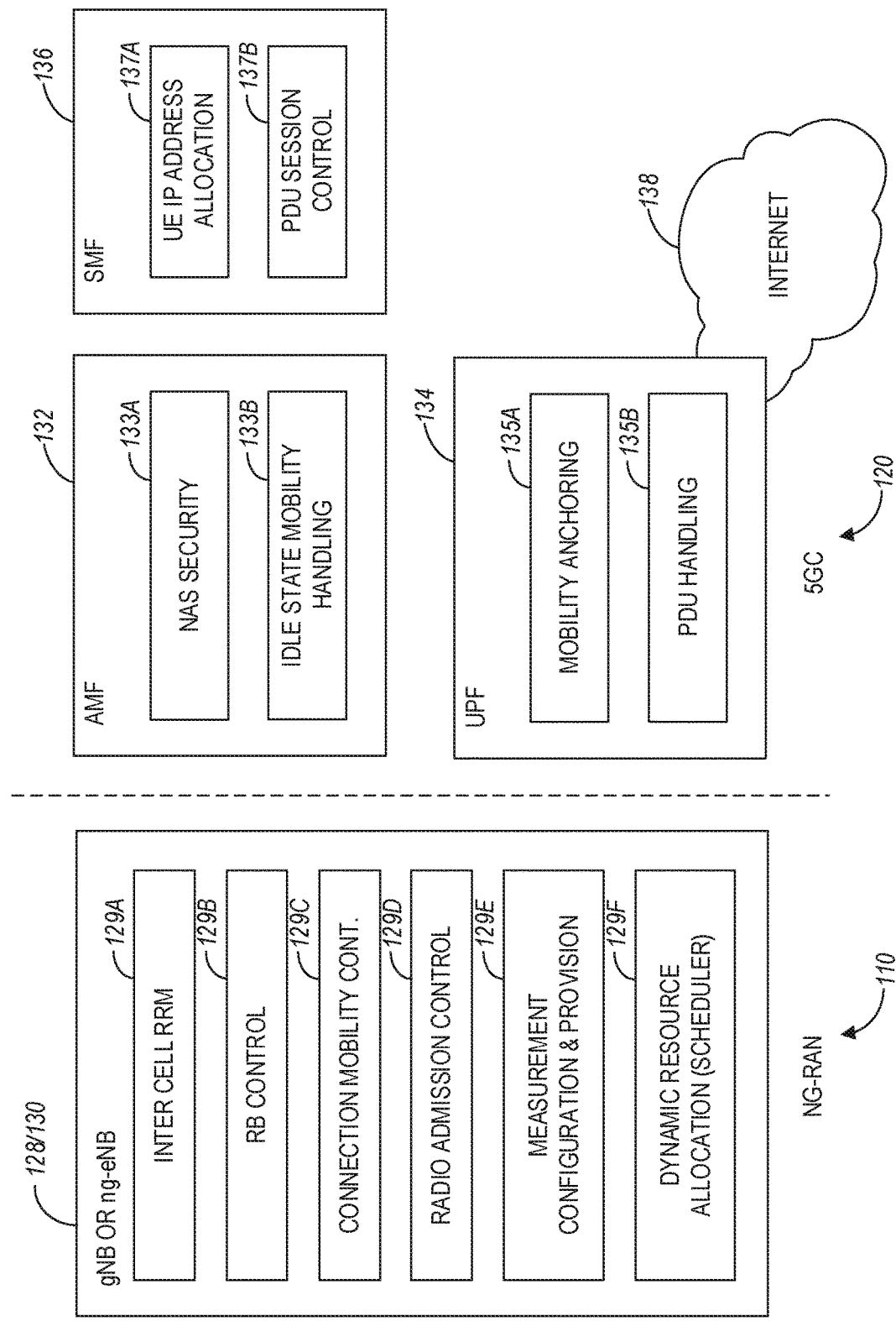
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured. to host the following functions, for example: session management; UE address allocation and management 137A; selection and control of user plane function (UPF); PDU session control 13M, including configuring traffic steering at UPF 134 to route traffic to proper destination; control part of policy enforcement and QoS; and/or downlink data notification, among other functions.

Figure 1E:
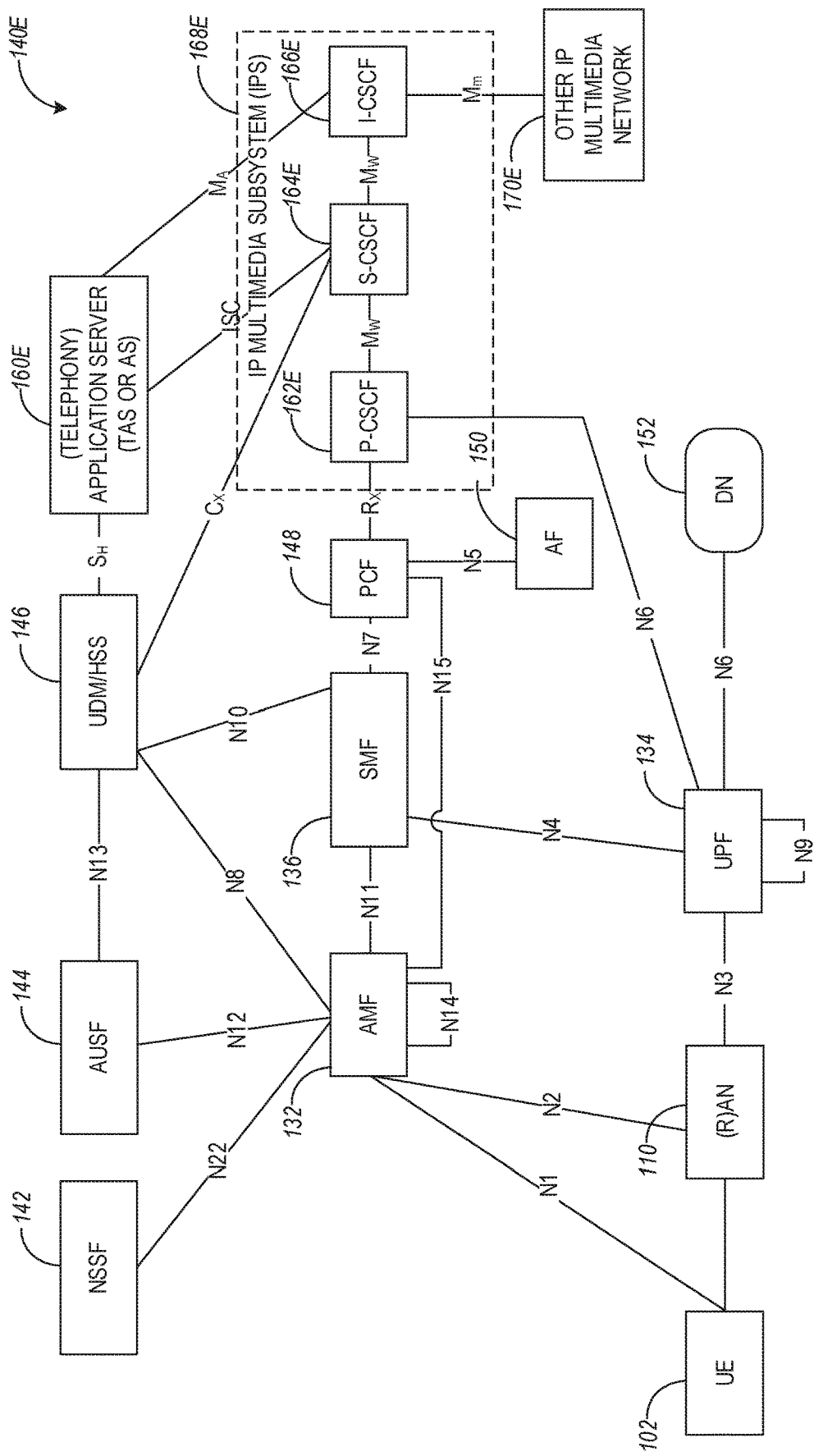
FIG. 1E and FIG. 1F illustrate a non-roaming 5G system architecture in accordance with some aspects.
Figure 1F:
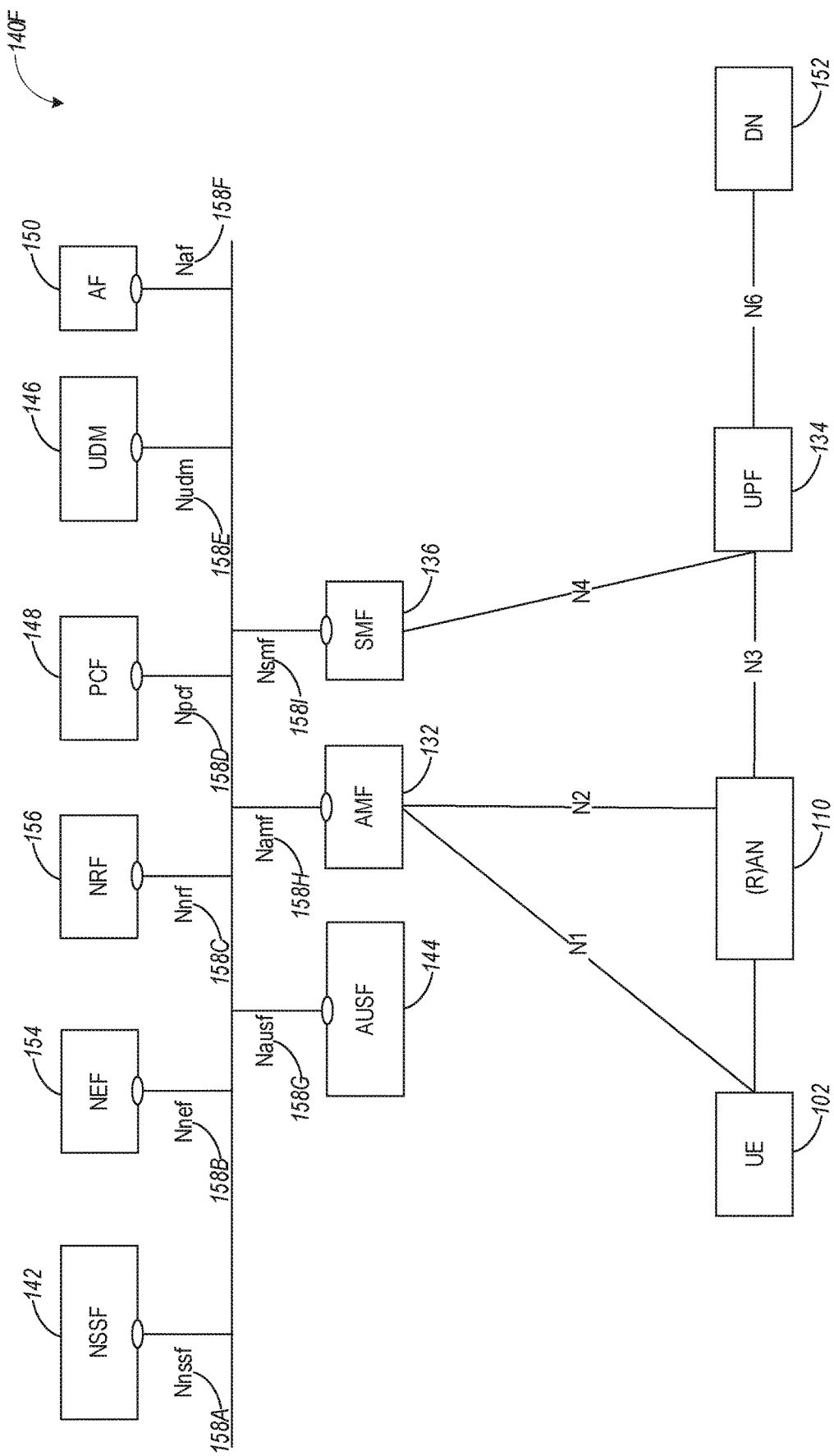

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use a unified access barring mechanism using one or more of the techniques described herein, which access barring mechanism can be applicable for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator specific ways.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that an interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDN4 146 and the SMF 136), N11 (between the AMF 132 and the SMF 136), N12 (between the AUSF 144 and the AN/IF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
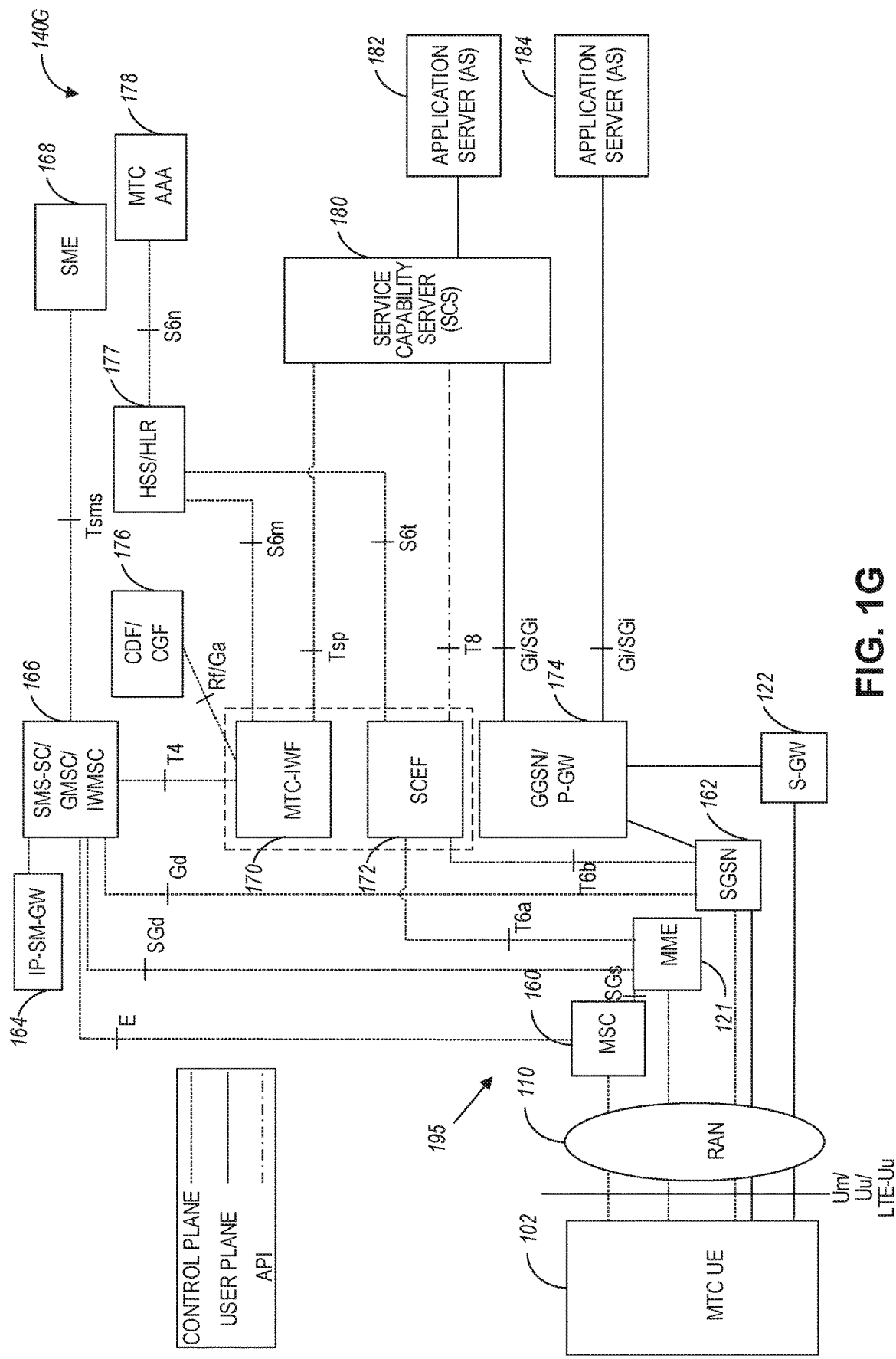
FIG. 1G illustrates an example Cellular Internet-of-Things (CIoT) network architecture in accordance with some aspects.

FIG. 1G illustrates an example CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support note (SGSN) 162, a S-GW 122, an IP-Short-Message-Gateway (IP-SM-GW) 164, a Short Message Service Service Center (SMS-SC)/ gateway mobile service center (GMSC)/Interworking MSC (IWMSC) 166, CIoTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, CIoTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (es., API interfaces to the SCS 180).

FIG. 1G further illustrates various reference points between different servers, functions, or communication nodes of the CIoT network architecture 140G. Some example reference points related to CIoTC-IWF 170 and SCEF 172 include the following: Tsms (a reference point used by an entity outside the 3GPP network to communicate with UEs used for CIoTC via SMS), Tsp (a reference point used by a SCS to communicate with the CIoTC-IWF related control plane signaling), T4 (a reference point used between CIoTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by CIoTC-IWF 170 to interrogate HSS/HLR 177), S6n (a reference point used by CIoTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an Sha reference point, and configured to authenticate/authorize CIoT UE 102 to access the CIoT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6*a*/T6*b* reference point, for service capability exposure. In some aspects, the SCEF 172 may act as an API GW towards a third-party application server such as AS 182. The SCEF 172 can be coupled to the HSS/HLR 177 and CIoTC AAA 178 servers using an S6*t* reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIot UE 102 can include a smart phone, a tablet computer, or one or more other electronic device acting as a CIoT device for a specific function, while having other additional functionality.

In some aspects, the RAN 110 can include a CIoT enhanced. Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MIME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or him ware modules. In some aspects, circuitry may include logic, at least partially operable in hardware. In some aspects, circuitry as well as modules disclosed herein may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
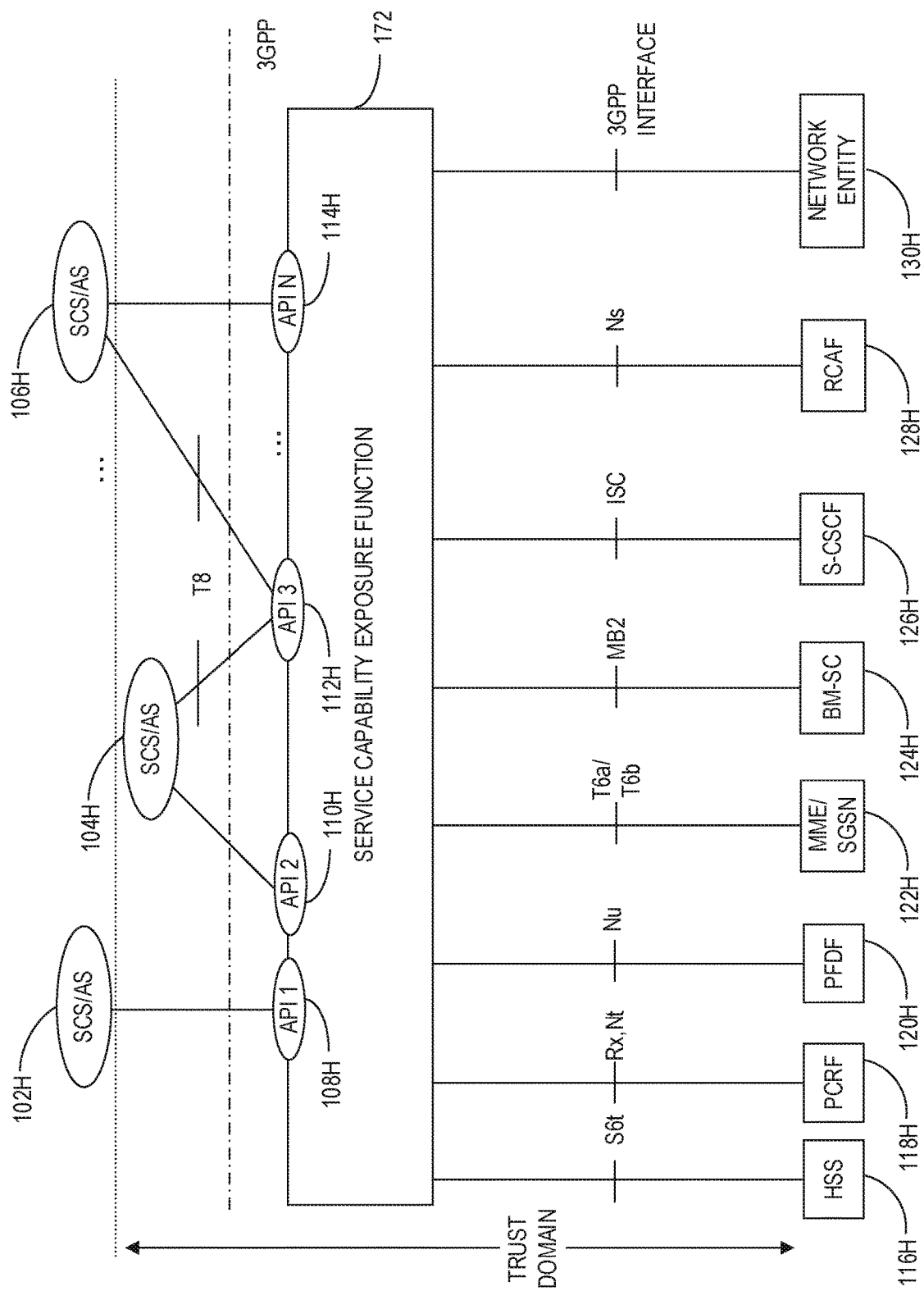
FIG. 1H illustrates an example Service Capability Exposure Function (SCEF) in accordance with some aspects.

FIG. 1H illustrates an example Service Capability Exposure Function (SCEF) in accordance with some aspects. Referring to FIG. 1H, the SCEF 172 can be configured to expose services and capabilities provided by 3GPP network interfaces to external third party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a 11/1ME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
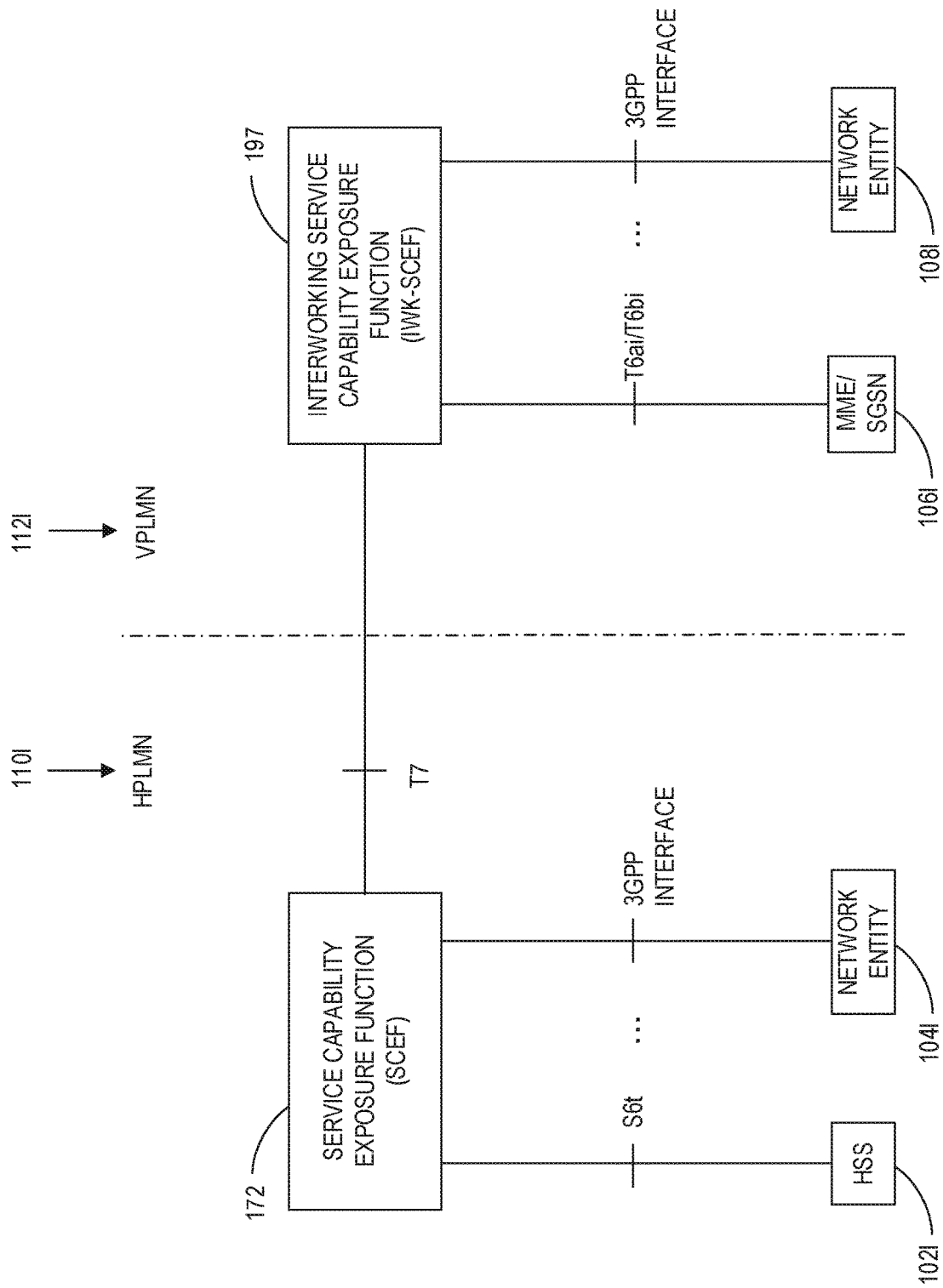
FIG. 1I illustrates an example roaming architecture for SCEF in accordance with some aspects.

FIG. 1I illustrates an example roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (MK-SCEF) 197 within the VPLMN 112I.

Figure 1J:
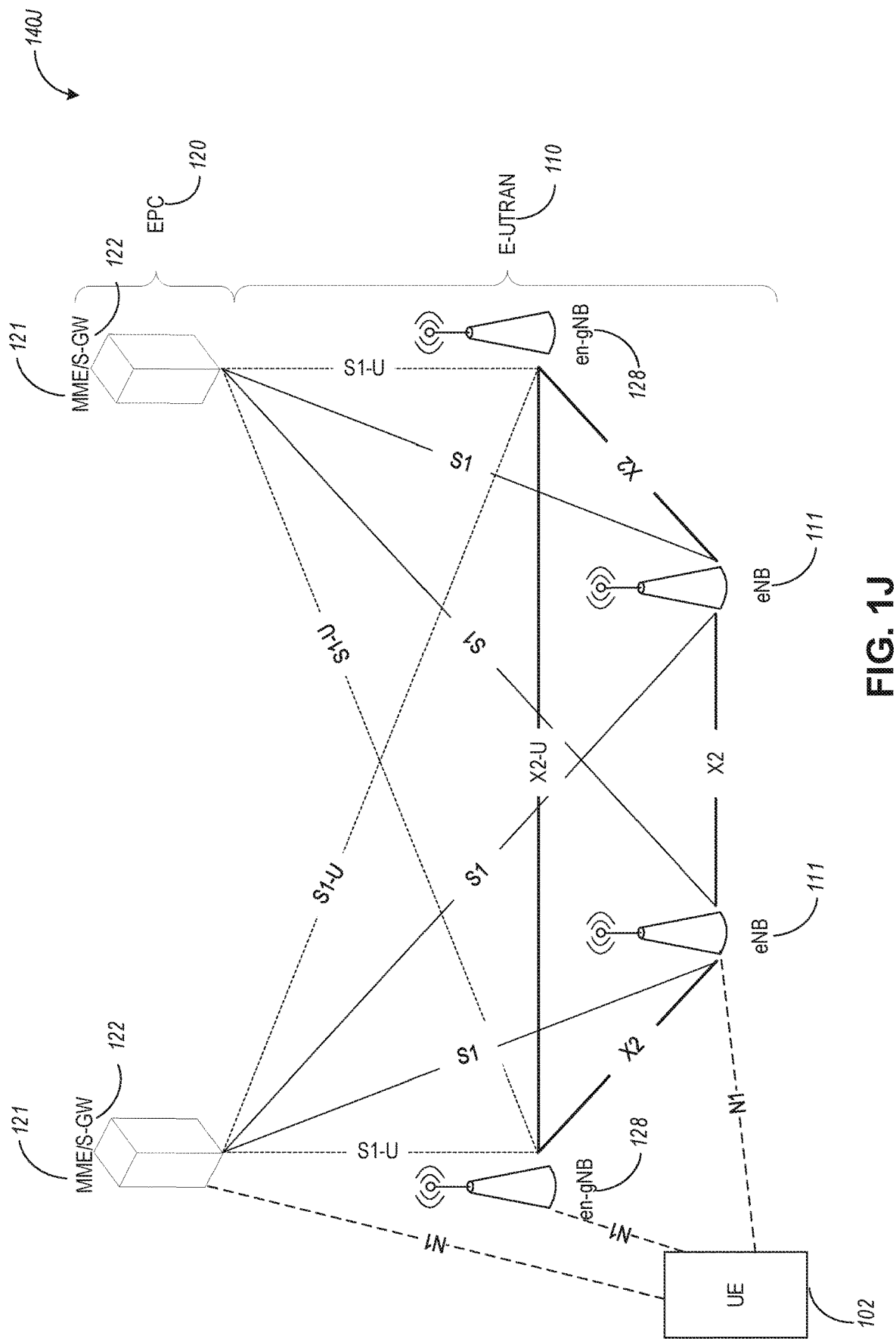
FIG. 1J illustrates an example Evolved Universal Terrestrial Radio Access (E-UTRA) New Radio Dual Connectivity (EN-DC) architecture in accordance with some aspects.

FIG. 1J illustrates an example Evolved Universal Terrestrial Radio Access (E-UTRA) New Radio Dual Connectivity (EN-DC) architecture in accordance with some aspects. Referring to FIG. 1G, the EN-DC architecture 140J includes radio access network (or E-TRA network, or E-TRAN) 110 and EPC 120. The EPC 120 can include MIMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102, and acting as Secondary Nodes (or SgNBs) in the EN-DC communication architecture 140J. The eNBs 111 can be configured as master nodes (or MeNBs) in the EN-DC communication architecture 140J, as illustrated in FIG. 1J, the eNBs 111 are connected to the EPC 120 via the S1 interface and to the EN-gNBs 128 via the X2 interface. The EN-gNBs 128 may be connected to the EPC 120 via the S1-U interface, and to other EN-gNBs via the X2-U interface.

Figure 2:
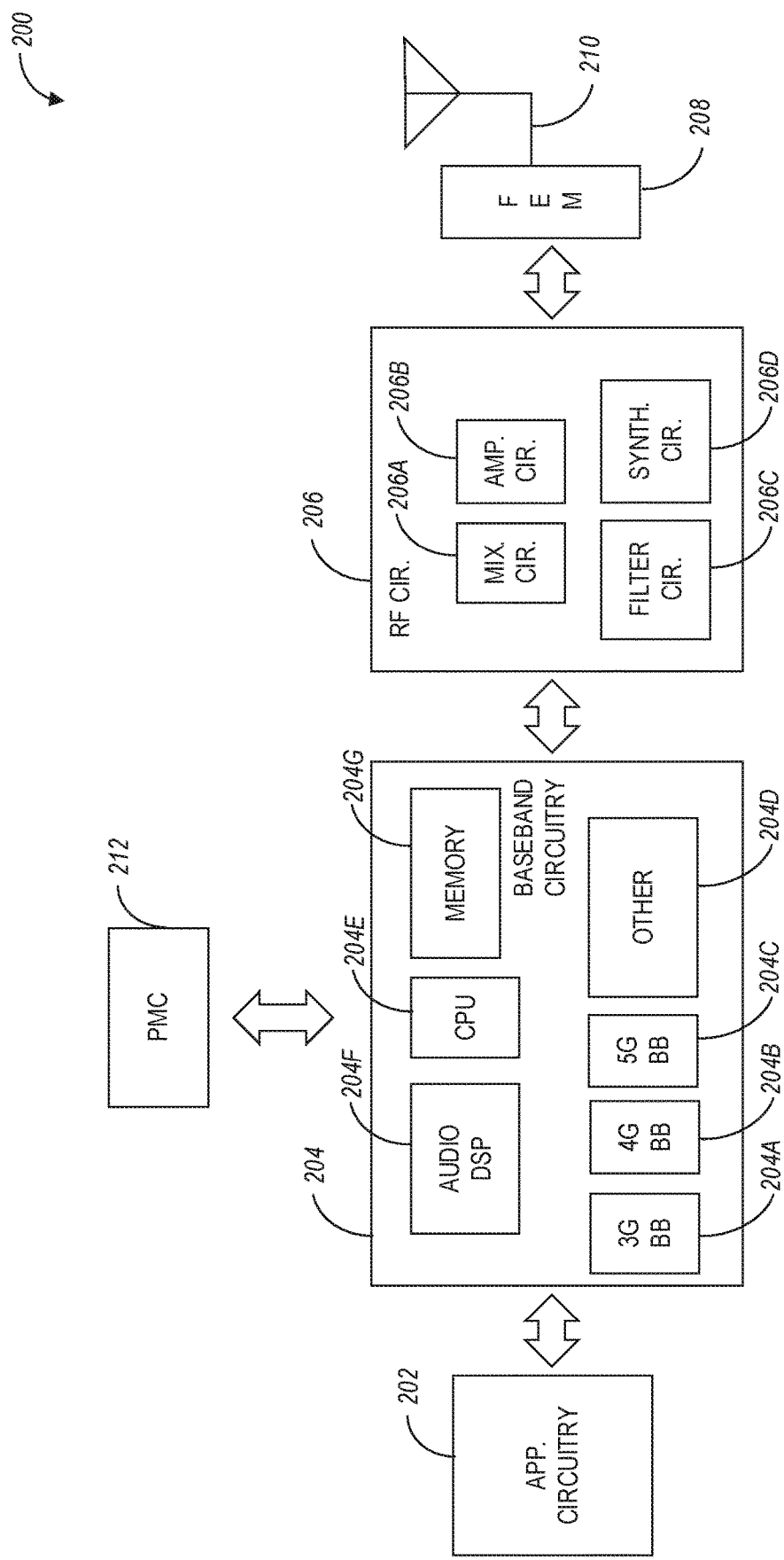
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (es., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry 204 may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and up conversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct up conversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. in these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. Divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL, may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
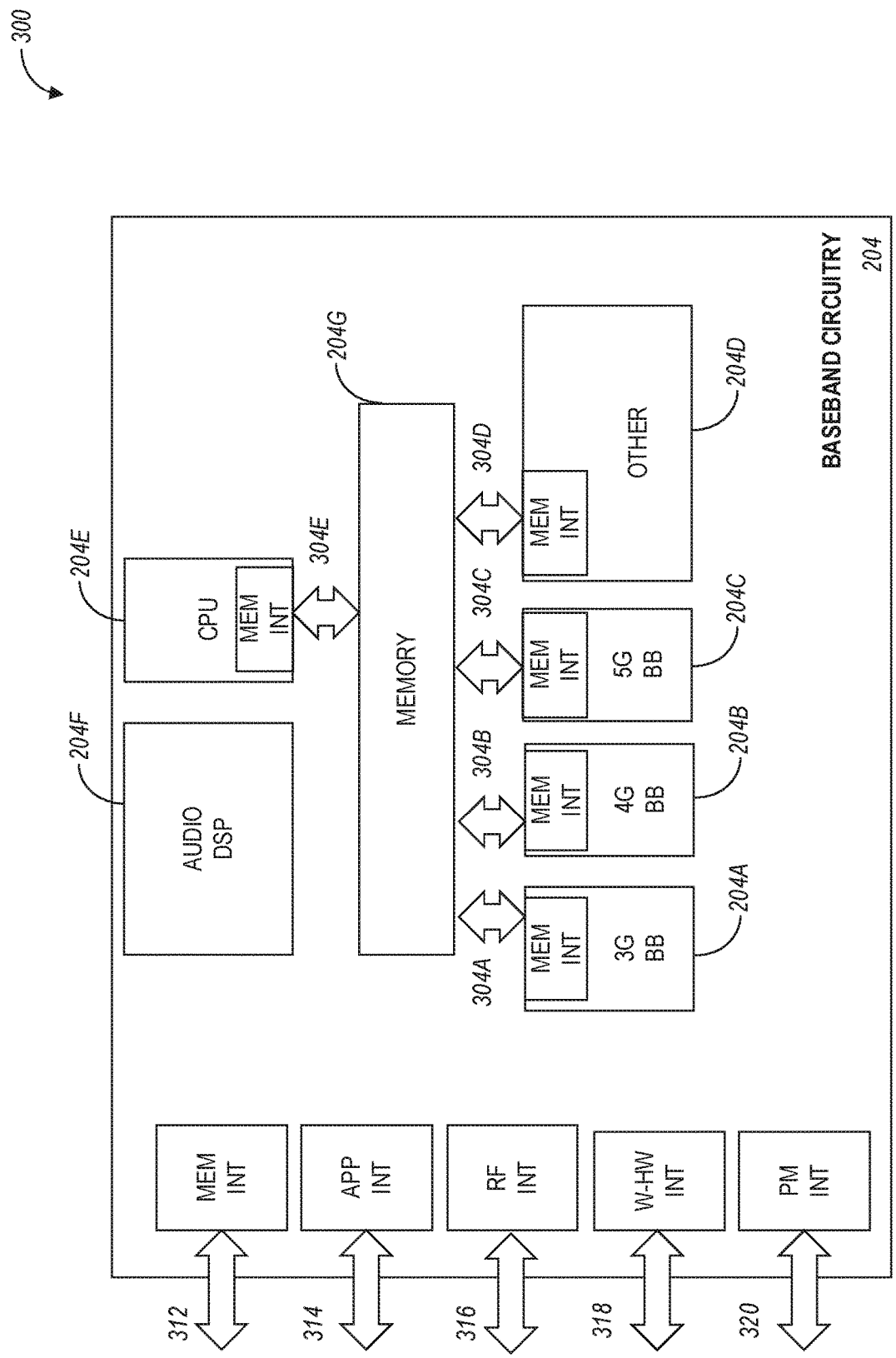
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuities/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
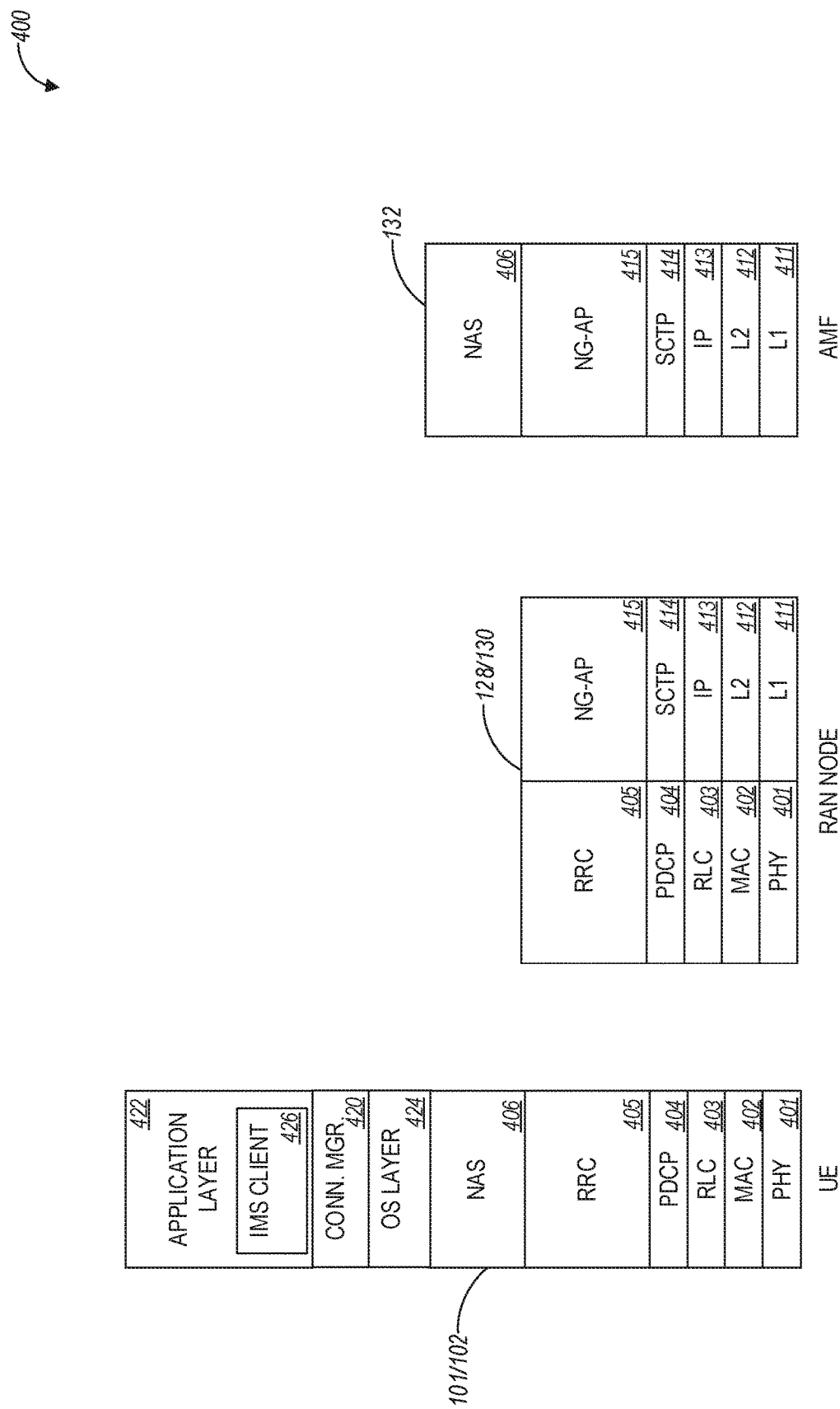
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may in some aspects operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and segmentation and reassembly of RLC SDUs for UM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 405 may include broadcast of system infounation (e.g., included in Master information Blocks (MIBs) or System information Blocks (SIBs) related to the non-access stratum (NAS)); broadcast of system information related to the access stratum (AS); paging initiated by 5GC 120 or NG-RAN 110, establishment, maintenance, and release of an RRC connection between the LIE and NG-RAN (e.g., RRC connection paging, RRC connection establishment, RRC connection addition, RRC connection modification, and RRC connection release, also for carrier aggregation and. Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS layer 406 in the UE and the NAS layer 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
|---|---|---|---|
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 401, the MAC layer 402, the RLC layer 403, the PDCP layer 404, and the RRC layer 405.

The non-access stratum (NAS) protocol layers 406 form the highest stratum of the control plane between the UE 101 and the AMF 132 as illustrated in FIG. 4. In aspects, the NAS protocol layers 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non-UE-associated services. These services perform functions including, but not limited to: UE context management, PDU session management and management of corresponding NG-RAN resources (e.g. Data Radio Bearers [DRBs]), UE capability indication, mobility, NAS signaling transport, and configuration transfer (es. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMT 132 to exchange information.

The RAN node 128/130 and the AMY 132 may utilize an N2 interface to exchange control plane data via a protocol stack comprising the L1 layer 411, the L2 layer 412, the IP layer 413, the SCTP layer 414, and the S1-AP layer 415.

Figure 5:
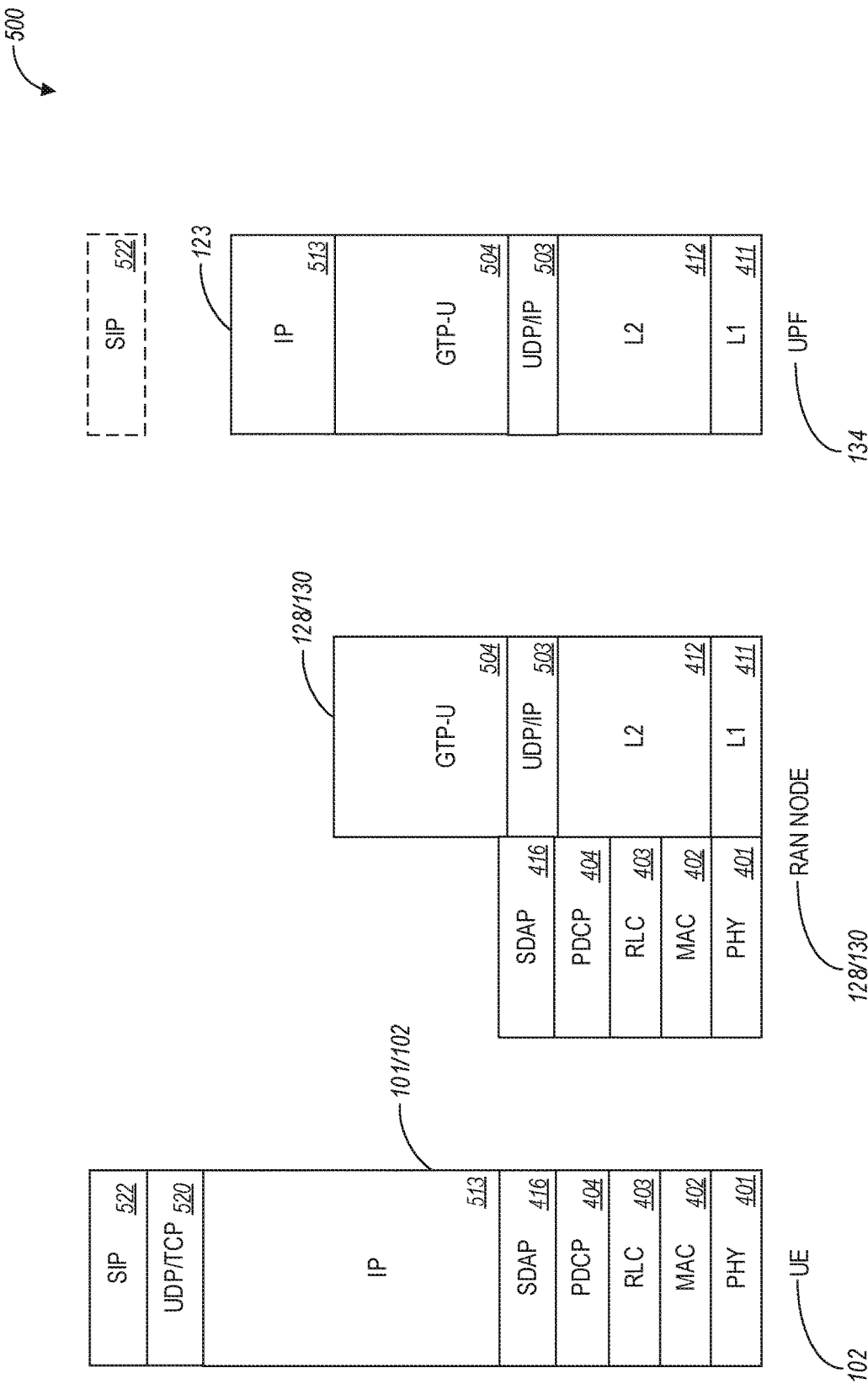
FIG. 5 is an illustration of a user plane protocol stack in accordance with some aspects.

FIG. 5 is an illustration of a user plane protocol stack in accordance with some aspects. in this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB), and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520, and can be used by the UE 102 and the UPF 134.

The General Packet Radio Service (GPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/1P layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
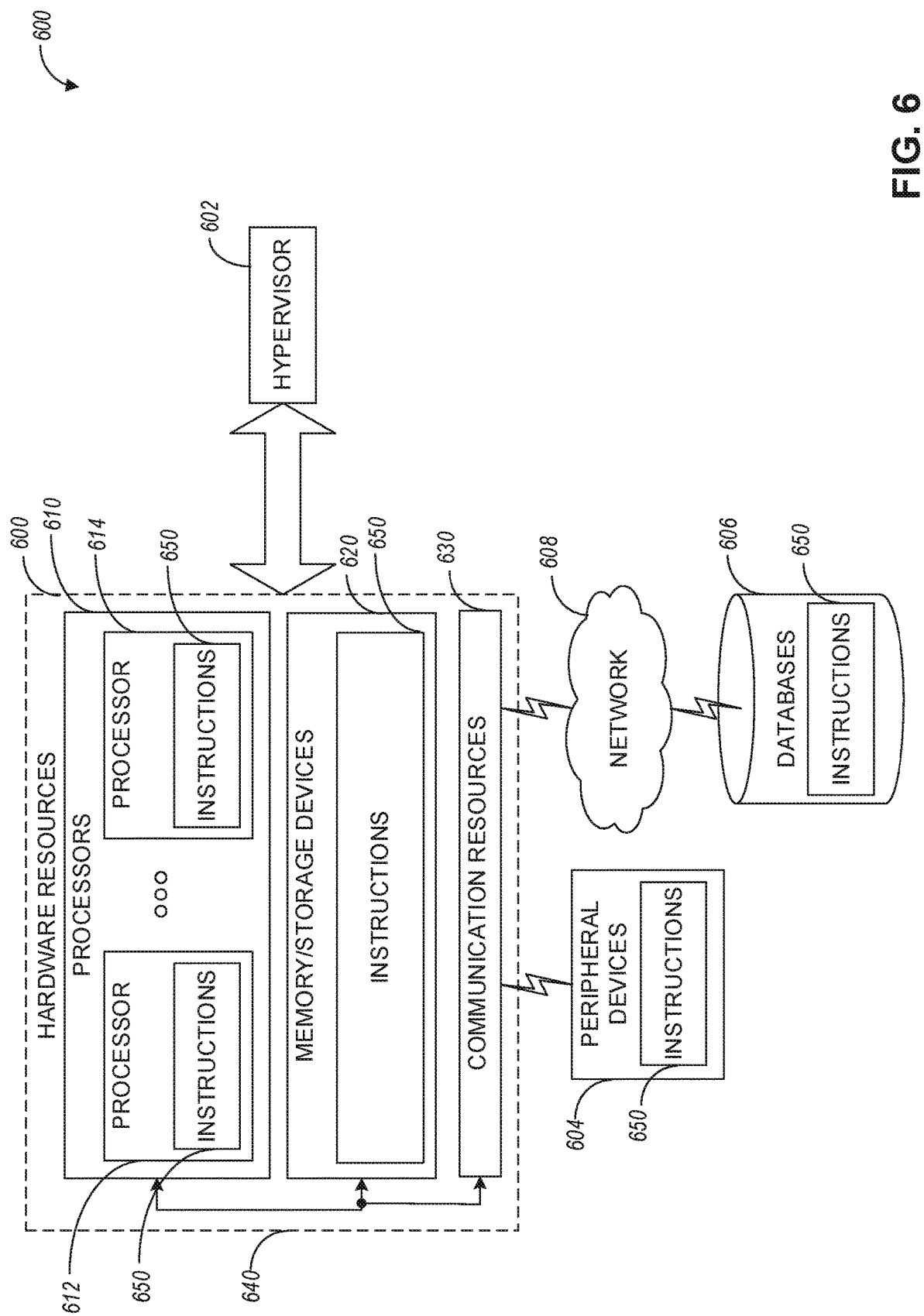
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
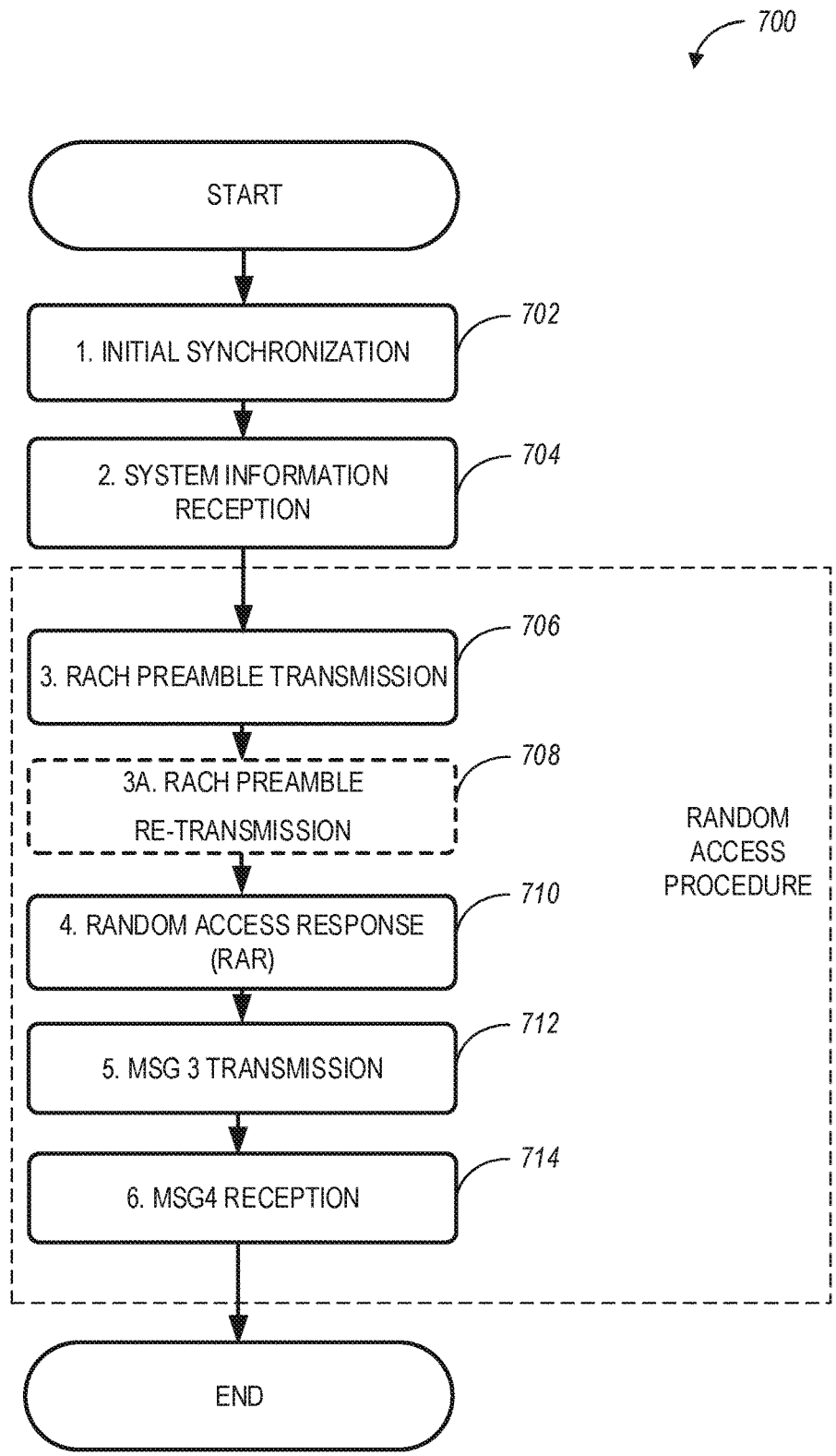
FIG. 7 is an illustration of an initial access procedure including PRACH preamble retransmission in accordance with some aspects.

FIG. 7 is an illustration of an initial access procedure 700 including PRACH preamble retransmission in accordance with some aspects. Referring to FIG. 7, the initial access procedure 700 can start with operation 702, when initial synchronization can take place. For example, the UE 101 can receive a primary synchronization signal and a secondary synchronization signal to achieve the initial synchronization. In some aspects, the initial synchronization at operation 702 can be performed using one or more SS blocks received within an SS burst set. At operation 704, the UE 101 can receive system information, such as one or more system information blocks (SIBS) and/or master information blocks (MIBs).

At operation 706 through 714, a random access procedure can take place. More specifically, at operation 706, a PRACH preamble transmission can take place as message 1 (Msg1). At operation 710, UE 101 can receive a random access response (RAR) message, which can be random access procedure message 2 (Msg2). In Msg2, the node (e.g., gNB) 111 can respond with random access radio network temporary identifier (RA-RNTI), which can be calculated from the preamble resource (e.g., time and frequency allocation).

In some aspects, UE 101 can be configured to perform one or more retransmissions of the PRACH preamble at operation 708, when the RAR is not received or detected within a preconfigured or predefined time window. The PRACH preamble retransmission can take place with power ramping, as explained herein below, so that the transmission power is increased until the random-access response is received.

At operation 712, UE 101 can transmit a random access procedure message 3 (Msg3), which can include a radio resource control (RRC) connection request message. At operation 714, a random access procedure message 4 (Msg4) can be received by the UE 101, which can include an RRC connection setup message, carrying the cell radio network temporary identifier (CRNTI) used for subsequent communication between the UE 101 and the node 111.

In some aspects, user equipment and communication nodes operating on mmWave bands can experience phase noise (PN) and carrier frequency offset (CFO) due to, e.g., transmitter and receiver frequency oscillator mismatch. More specifically, phase noise can be generated from noise in the active components in lossy elements, which can be up convert it to the carrier frequency resulting in inferior transmit/receive performance. In some aspects, the PN and CFO impact may become severe for 5G communication systems operating in high frequency bands (e.g., because is greater than 6 GHz). The Phase Tracking Reference Signal (PT-RS) can be configured using one or more of the techniques described herein to track and mitigate the effects of phase noise and phase shifting at a communication device transceiver circuitry.

Figure 8:
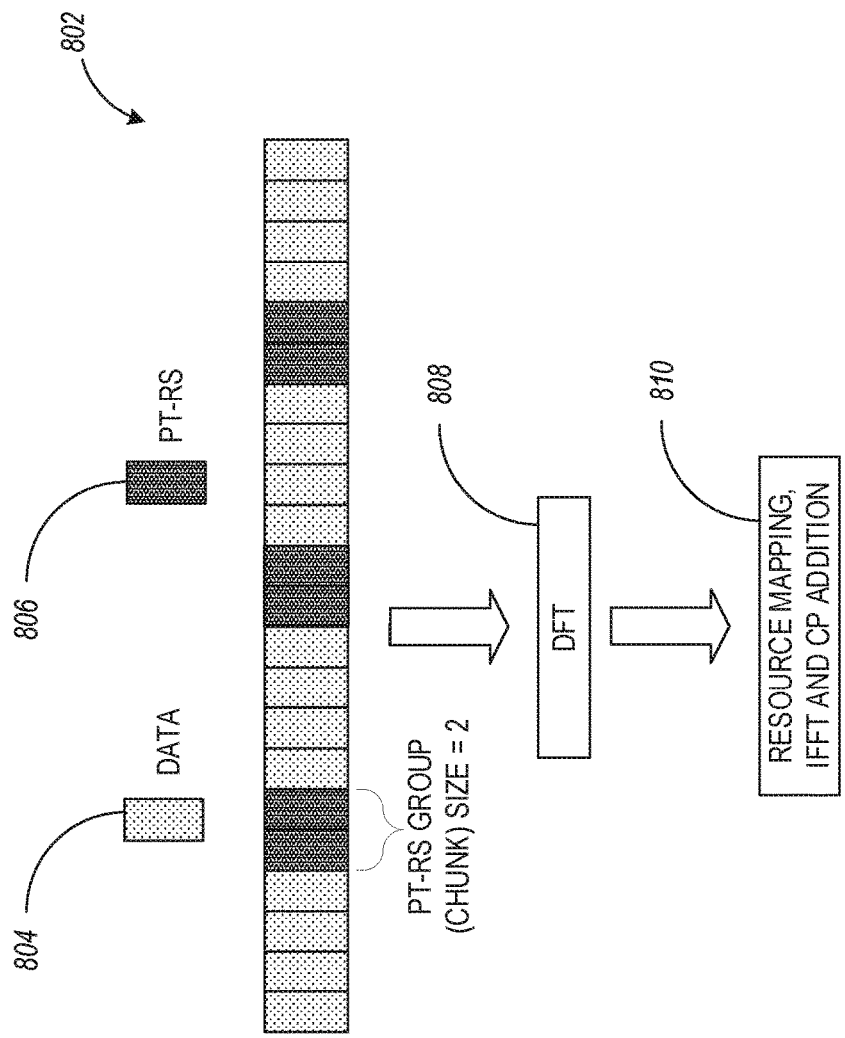
FIG. 8 illustrates an example of chunk-based PT-RS for a digital Fourier transform (DFT) spread orthogonal frequency division multiplexing (DFT-s-OFDM) waveform, in accordance with some aspects.

In some aspects, for a cyclic prefix OFDM (CP-OFDM) waveform, the PT-RS and data can be multiplexed in Frequency Division Multiplexing (FDM) manner, with some resource elements being used for PT-RS. For DFT-s-OFDM waveform, the PT-RS can be inserted before the DFT. FIG. 8 illustrates an example of chunk-based PT-RS for a DFT-s-OFDM waveform, in accordance with some aspects. Referring to FIG. 8, the DFT-s-OFDM waveform 802 can include data 804 and PT-RS 806. The PT-RS 806 can be spread out in multiple groups or chunks, and each chunk can be of size 2 symbols (other chunk sizes can be used as well). The waveform 802 can be transformed using DFT operation 808, followed by resource mapping, inverse fast Fourier transform (IFFT), and cyclic prefix addition at operation 810.

Techniques disclosed herein can be used for PT-RS configuration for DFT-s-OFDM waveform and CP-OFDM waveform, as well as for PT-RS association table configuration for both CP-OFDM and DFT-s-OFDM waveforms.

PT-RS Configuration

In some aspects, the PT-RS can be used for phase shift compensation resulting from the phase noise and CFO for both a DFT-s-OFDM waveform and a CP-OFDM waveform. In aspects when the phase shift is low, the PT-RS can be disabled so as to reduce its overhead.

In some aspects, In an embodiment, the dynamic presence and/or time and/or frequency domain density and/or chunk size of PT-RS can be determined based on at least one of the following techniques:

(a) Based on a number of front-loaded demodulation reference signal (DM-RS) symbols, where the symbols are fixed (e.g., either the 3rd or 4th symbol) for PDSCH or in front of the PUSCH symbols;

(b) Based on a number of additional DM-RS symbols, where the symbols are after at least one symbol of PDSCH or PUSCH; and (c) Based on whether time domain Orthogonal Cover Code (TD-OCC) is used for DM-RS or other reference signal, such as Channel State information Reference Signal (CSI-RS). In some aspects, the TD-OCC can be configured by control signaling (such as DCI) and can be set to ON or OFF. In some aspects, if TD-OCC is enabled, PT-RS with a first time domain density can be used (e.g., time domain density of one as listed in the table below), and if TD-OCC is disabled, PT-RS with a second time domain density can be used (e.g. time domain density of two as listed in the table below).

In some aspects, the above associations (including the associations listed in the tables below) can be pre-defined and/or configured by higher layer signaling or Downlink Control Information (DCI) and/or recommended by the UE.

In some aspects, if TD-OCC is enabled and is used with two front-loaded DM-RS symbols (which means the phase shift between two symbols is not significant), a low density PT-RS (e.g., time density of one) or no PT-RS can be used. Table 2 below illustrates one example of association table.

TABLE 2 an example of association table between PT-RS
density and number of front-loaded DM-RS

| Number of front-loaded DM-RS symbols | PT-RS time domain density |
|---|---|
| 1 | Time domain density set 1, e.g.{every symbol, every $2^{nd}$ symbol, every $4^{th}$ symbol} |
| 2 | Time domain density set 2, e.g.{every $2^{nd}$ symbol, every $4^{th}$ symbol} |

In another aspect, if the additional DM-RS symbol is used, the Doppler frequency offset may be large. Consequently, the PT-RS can be transmitted at every symbol and the size of chunk PT-RS for DFT-s-OFDM can be increased. Table 3 below illustrates one example for the association table definitions.

TABLE 3 an example association table between PT-RS density and number of additional DM-RS

| Number of additional DM-RS symbol(s) | PT-RS time domain density |
|---|---|
| 0 | Time domain density set 1, e.g.{every symbol, every $2^{nd}$ symbol, every $4^{th}$ symbol} |
| 1 | Time domain density set 2, e.g.{every symbol} |
| 2 | Time domain density set 3, e.g.{every symbol} |

In some aspects, the time domain density of PT-RS can be selected based on the above association tables as well as from one or more corresponding time density sets, which can be determined based on modulation and coding scheme (MCS), bandwidth (BW), and/or subcarrier spacing (SCS). Some example PT-RS density tables based on MCS, BW, and/or SCS are illustrated hereinbelow.

In some aspects, if TD-OCC with length 4 is configured for CSI-RS, the PT-RS may be disabled since the phase shift between the 4 symbols may not be significant.

Figure 9:
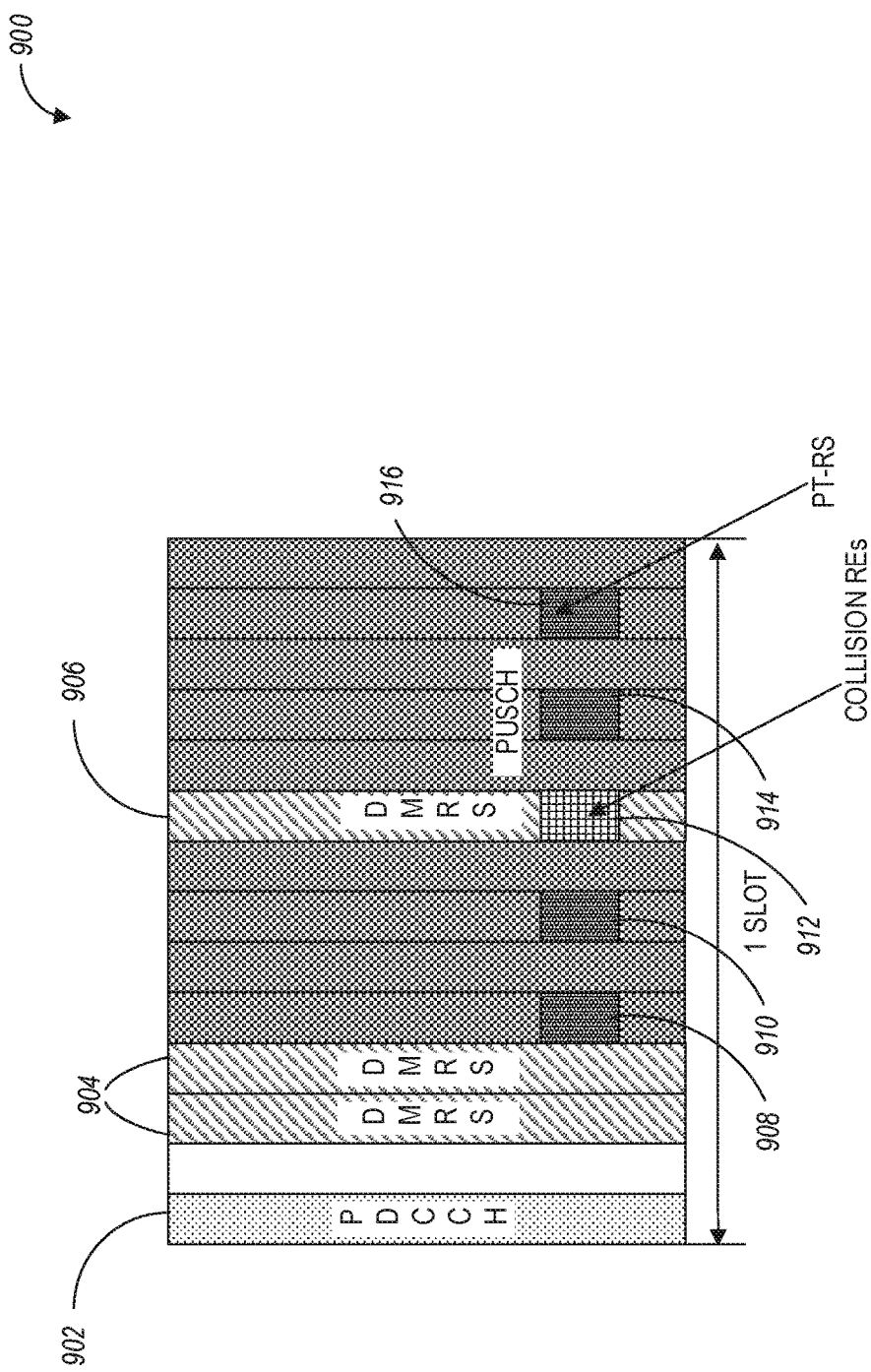
FIG. 9 illustrates an example slot with PT-RS and DM-RS symbol collision, in accordance with some aspects.

FIG. 9 illustrates an example slot 900 with PT-RS and DM-RS symbol collision, in accordance with some aspects. Referring to FIG. 9, slot 900 can include PDCCH 902, front-loaded DM-RS 904, followed by PUSCH with additional DM-RS 906. PT-RS 908, 910, 912, 914, and 916 can be configured after the front-loaded DM-RS 904. As illustrated in FIG. 9, a resource element (RE) (or REs) for PT-RS 912 collides with a RE (or REs) within the additional DM-RS 906. In this case, one or more of the techniques described in connection with FIG. 10, FIG. 11, and FIG. 12 can be used to handle the PT-RS collision.

Figure 10:
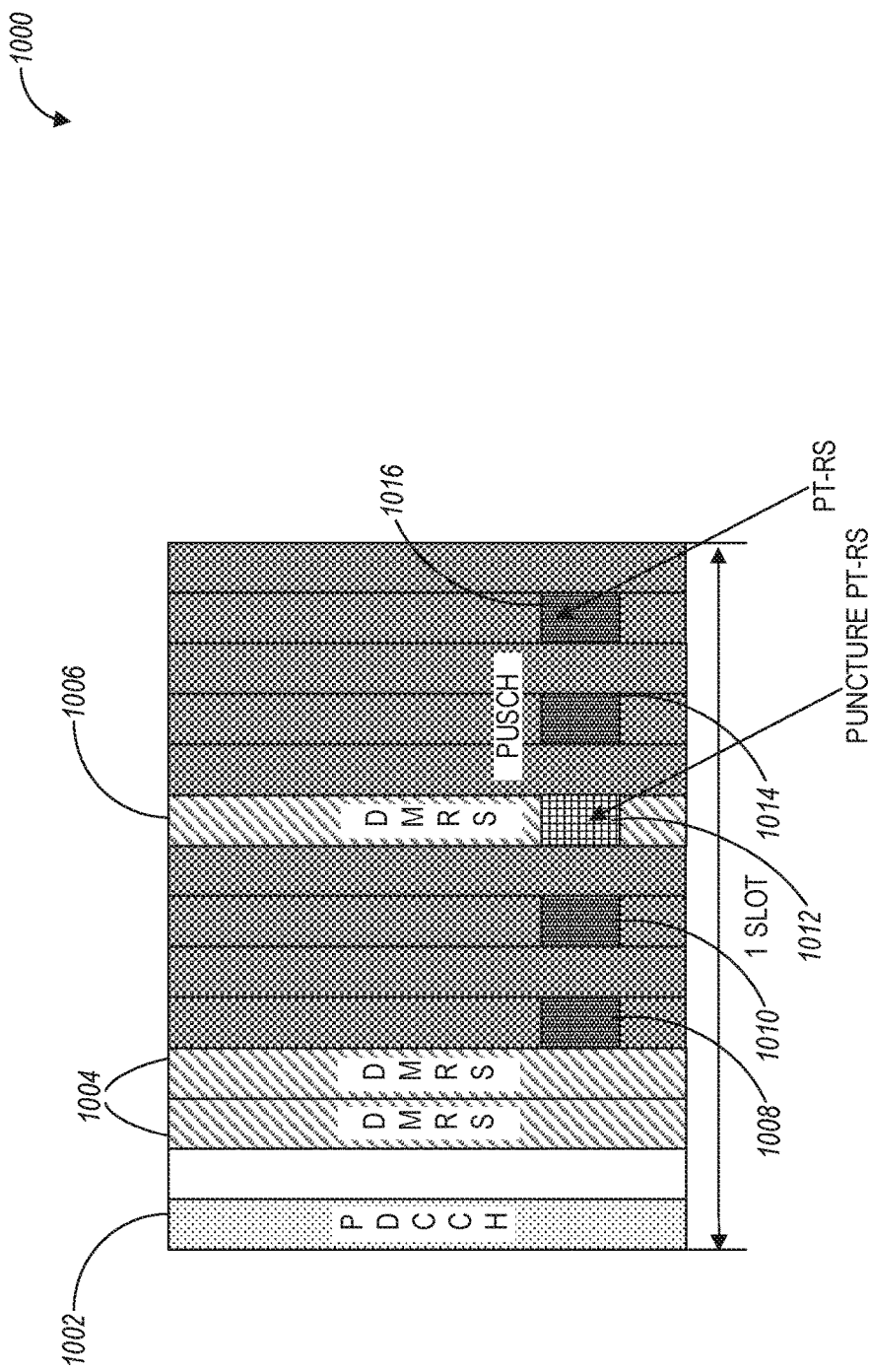
FIG. 10 illustrates an example slot with PT-RS collision handling using PT-RS puncturing, in accordance with some aspects.

FIG. 10 illustrates an example slot 1000 with PT-RS collision handling using PT-RS puncturing, in accordance with some aspects. Referring to FIG. 10, slot 1000 can include PDCCH 1002, front-loaded DM-RS 1004, followed by PUSCH with additional DM-RS 1006. PT-RS 1008, 1010, 1012, 1014, and 1016 can be configured after the front-loaded DM-RS 1004. As illustrated in FIG. 10, a RE (or REs) for PT-RS 1012 collides with a RE (or REs) within the additional DM-RS 1006. In some aspects, the PT-RS 1012 at the collided RE (or REs) can be punctured as illustrated in FIG. 10. In this regard, the additional DM-RS 1006 is transmitted in aspects when the PT-RS collides with the additional DM-RS.

Figure 11:
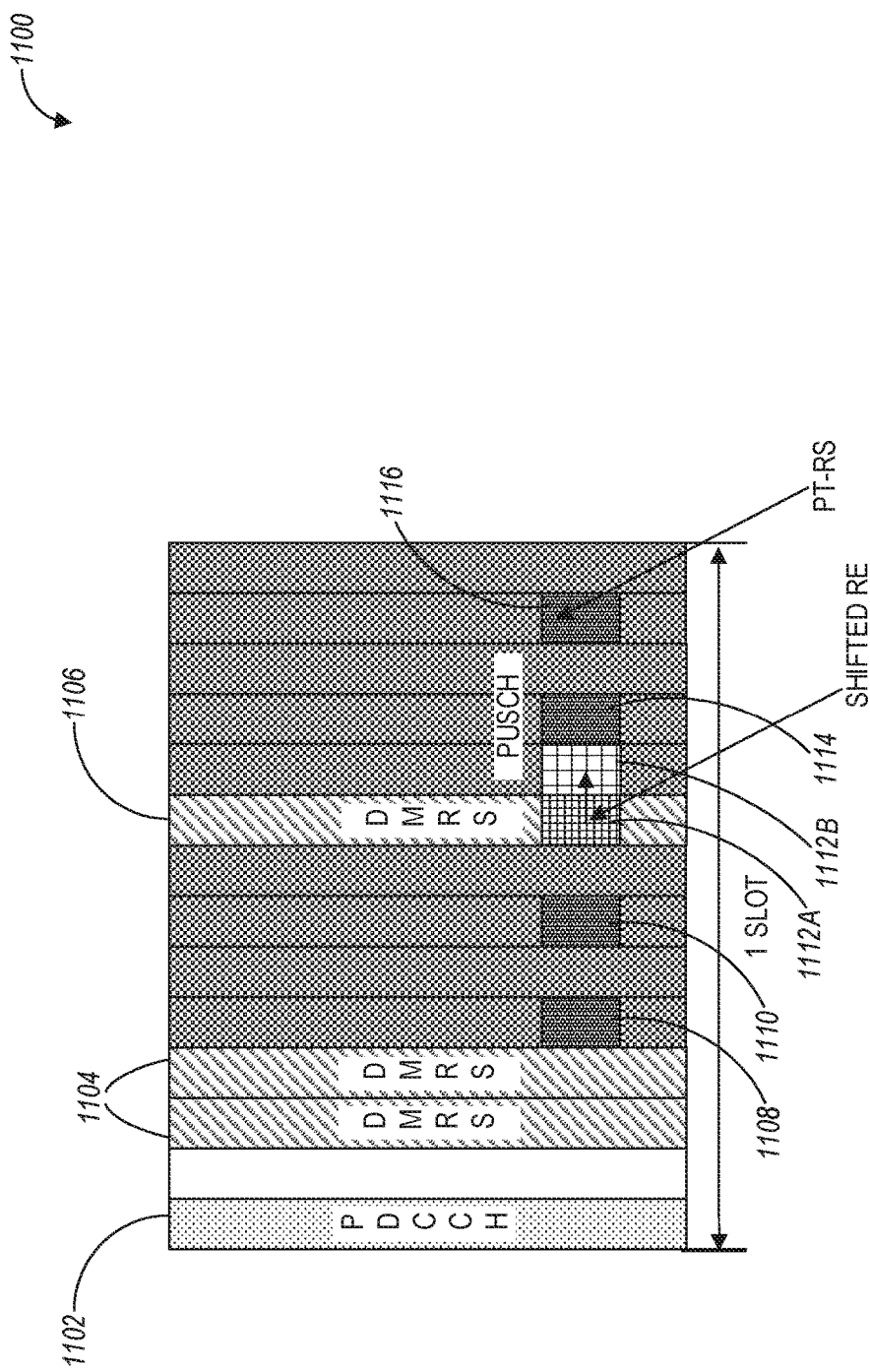
FIG. 11 illustrates an example slot with PT-RS collision handling using a resource element shifting, in accordance with some aspects.

FIG. 11 illustrates an example slot 1100 with PT-RS collision handling using a resource element shifting, in accordance with some aspects. Referring to FIG. 11, slot 1100 can include PDCCH 1102, front-loaded DM-RS 1104, followed by PUSCH with additional DM-RS 1106. PT-RS 1108, 1110, 1112A, 1114, and 1116 can be configured after the front-loaded DM-RS 1104. As illustrated in FIG. 11, a RE (or REs) for PT-RS 1112A collides with a RE (or REs) within the additional DM-RS 1106. In some aspects, the PT-RS 1012A at the collided RE (or REs) can be shifted to the neighboring symbol/subcarriers as illustrated in FIG. 11. In this regard, PT-RS 1112B is transmitted in place of the collided PT-RS 1112A.

Figure 12:
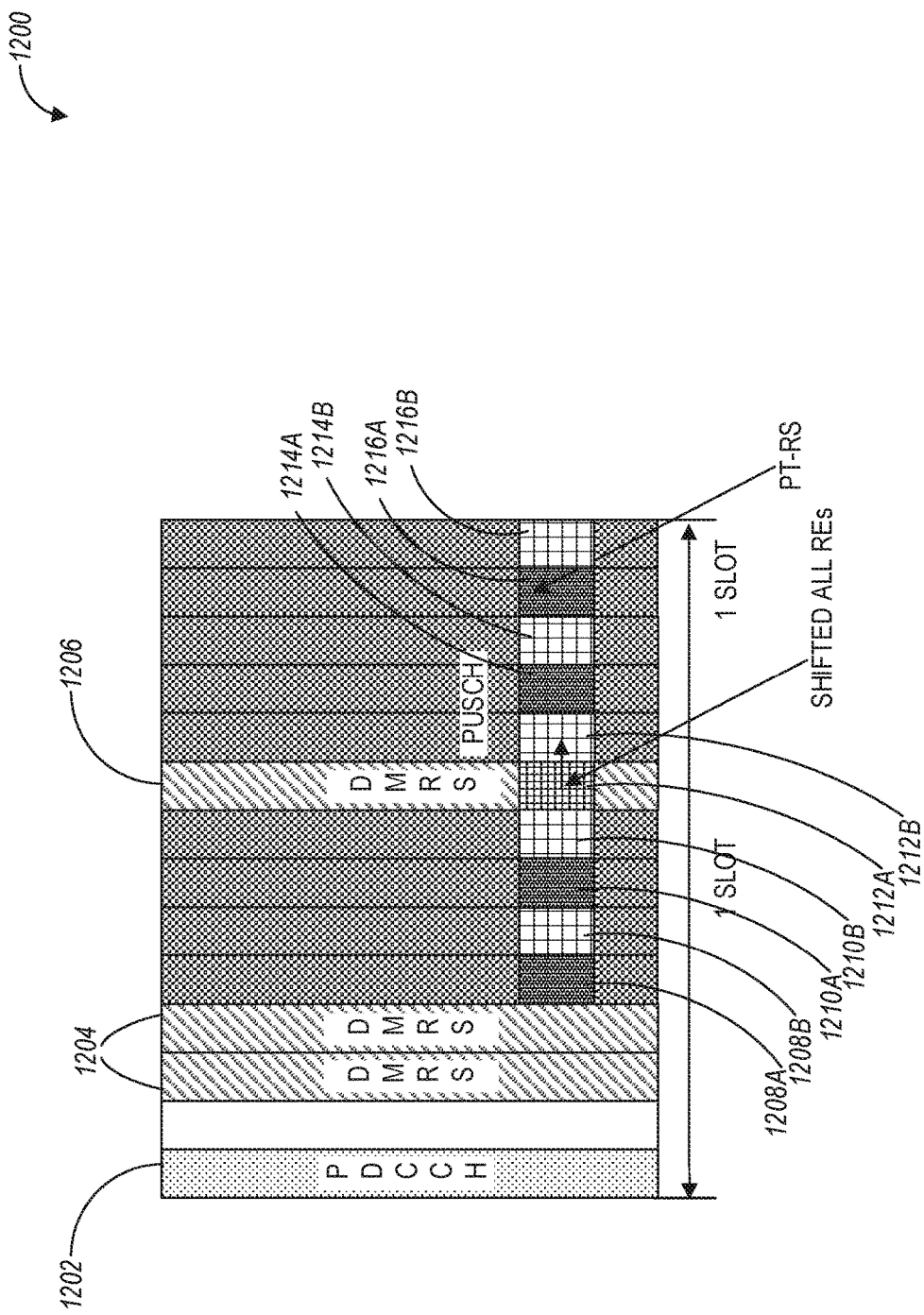
FIG. 12 illustrates an example slot with PT-RS collision handling using shifting of multiple resource elements, in accordance with some aspects.

FIG. 12 illustrates an example slot 1200 with PT-RS collision handling using shifting of multiple resource elements, in accordance with some aspects. Referring to FIG. 12, slot 1200 can include PDCCH 1202, front-loaded DM-RS 1204, followed by PUSCH with additional DM-RS 1206. PT-RS 1208A, 1210A, 1212A, 1214A, and 1216A can be configured after the front-loaded DM-RS 1204. As illustrated in FIG. 12, a RE (or REs) for PT-RS 1212A collides with a RE (or REs) within the additional DM-RS 1206. In some aspects, the entire PT-RS (including PT-RS 1208A, 1210A, 1212A, 1214A, and 1216A) can be shifted to the neighboring symbol/subcarriers as illustrated in FIG. 12. In this regard, PT-RS 1208B, 1210B, 1212B, 1214B, and 1216B are transmitted in place of PT-RS 1208A, 1210A, 1212A, 1214A, and 1216A.

In some aspects, selection of PT-RS collision handling techniques illustrated in FIG. 10-FIG. 12 can be pre-defined or configured by higher layer signaling, DCI, or determined by the number of additional symbols and/or the density of the PT-RS. In an example, if the time domain density of PT-RS is to map the PT-RS in every symbol, when collision occurs, the PT-RS handling techniques illustrated in FIG. 10 can be used.

In some aspects, the above collision handling techniques can also be applied to aspects when PT-RS is collided with other reference signal or channels, such as Tracking Reference Signal (TRS), channel state information-reference signal (CSI-RS), PDCCH, PUCCH, and so forth.

Figure 13:
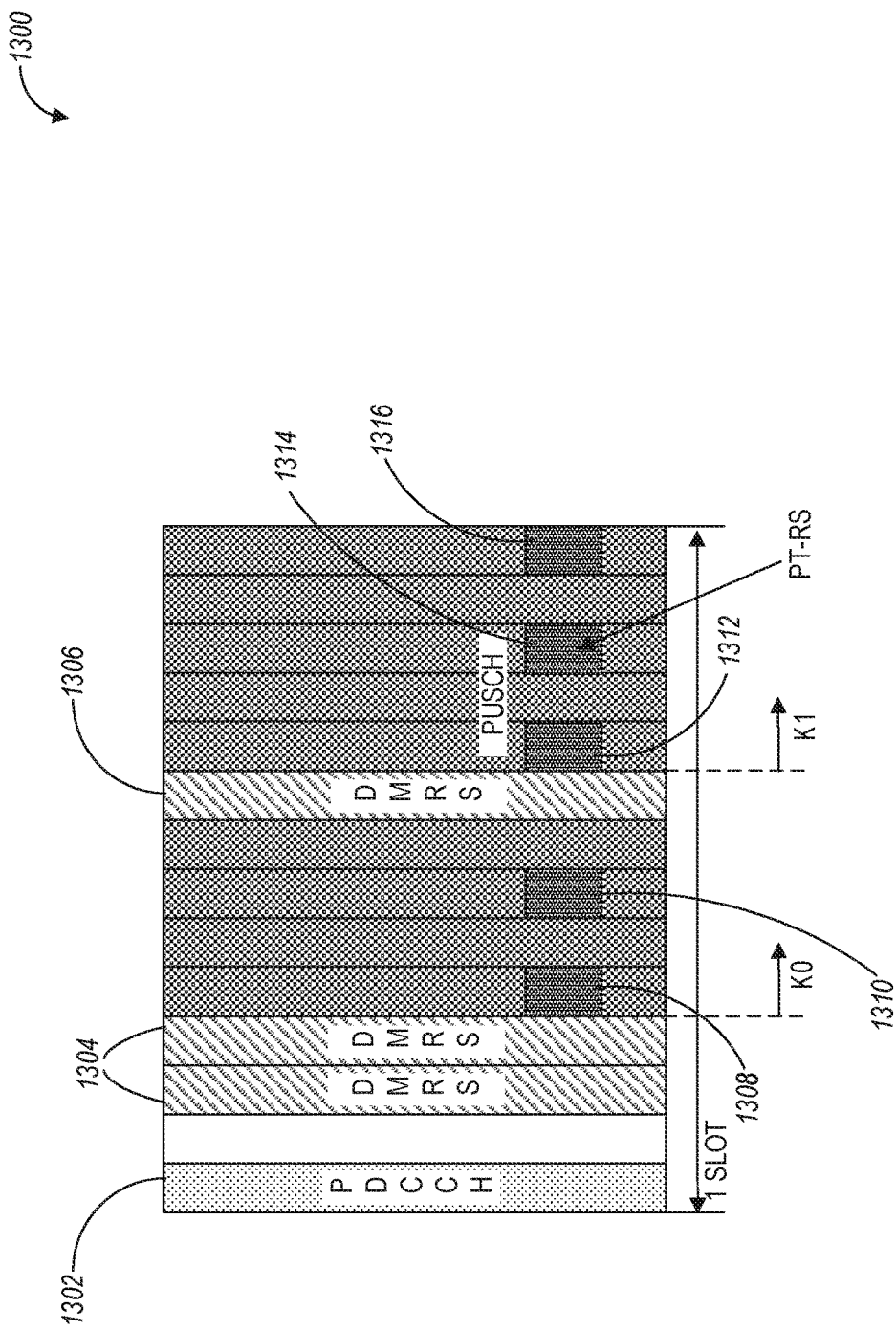
FIG. 13 illustrates an example slot with PT-RS multiplexing when an additional DM-RS symbol is used, in accordance with some aspects.

FIG. 13 illustrates an example slot 1300 with PT-RS multiplexing when an additional DM-RS symbol is used, in accordance with some aspects. Referring to FIG. 13, slot 1300 can include PDCCH 1302, front-loaded DM-RS 1304, followed by PUSCH with additional DM-RS 1306. PT-RS 1308 and 1310 can be configured after the front-loaded DM-RS 1304, and PT-RS 1312, 1314, and 1316 can be configured after the additional DM-RS 1306.

In some aspects, when additional DM-RS is enabled, the PT-RS can be mapped to k0 number of symbols after the front-loaded DM-RS and k1 number of symbol after the additional DM-RS, where k0 and k1 can be pre-defined or configured by higher layer signaling or DCI or determined based on the density of PT-RS. FIG. 13 illustrates one example when parameter k0=1 and parameter k1=1 and the PT-RS density is every 2nd symbol. In some aspects, this technique can also be used to identify the time position of the PT-RS for a DFT-s-OFDM waveform.

In some aspects, for chunk-based PT-RS for a DFT-s-OFDM waveform, the symbol index $S_j(n)$ of each chunk j with chunk size N can be determined by the number of DFT points $N_{DFT}$ (which can be based on the allocated bandwidth) as well as the number of chunks K (which can be determined based on the MCS and/or bandwidth). In one example, the symbol index can be calculated as follows:

$$S_j(n) = \left\lfloor \frac{N_{DFT}}{K+1} \right\rfloor + n, n = 0, 1, \ldots, N-1.$$

Alternatively, the starting symbol of chunk based PT-RS can be configured by higher layer signaling, DCI or predefined in a wireless specification, or a combination thereof.

Association Table Definition

In some aspects, the dynamic presence and time/frequency density of the PT-RS for CP-OFDM can be determined by the SCS, MCS, and/or BW. In this regard, predefined association tables for determining the time/frequency density of the PT-RS based on SCS, MCS, and/or BW can be configured. In some aspects, one association table can be defined for idle mode, where the highest density of PT-RS can be used. Table 4 and Table 5 illustrate one example for association table definitions.

TABLE 4 an example for association table of idle mode
time domain density for PT-RS for CP-OFDM

| MCS | Time domain density |
|---|---|
| MCS >= 0 | PT-RS should be mapped to every symbol |

TABLE 5 an example for association table of idle mode
frequency domain density for PT-RS for CP-OFDM

| BW | Frequency domain density |
|---|---|
| Number of allocated RB >= 0 | 1 or 2 RE/RB/Symbol |

In another aspect, the number of chunks and the size of chunk and the time domain density for PT-RS for DFT-s-OFDM can be determined based on SCS and/or BW and/or MCS. For idle mode, the PT-RS with highest density can be used, where the size of chunk and the number of chunks can be the largest, the value of which can be pre-defined. Table 6 illustrates one example for the association table for chunk-based PT-RS for DFT-s-OFDM waveform, where aj, bj, cj, Ncj and Scj, j=1, 2, can be pre-defined or configured by DCI, higher layer signaling, or recommended by the UE.

TABLE 6 an example for association table of chunk-based PT-RS

| Configuration | Number of chunks | Size of chunk |
|---|---|---|
| SCS < a1 and/or BW < b1 and/or MCS < c1 | No PT-RS | No PT-RS |
| SCS >= a1 and SCS < a2; and/or BW >= b1 and BW < b2; and/or MCS >= c1 and MCS < c2 | Nc1 | Sc1 |
| SCS >= a2 and/or BW >= b2 and/or MCS >= c2 | Nc2 | Sc2 |

In some aspects, a user equipment (UE) can include circuitry to determine the dynamic presence and time and frequency density of PT-RS for both CP-OFDM and DFT-s-OFDM waveform using one or more of the techniques disclosed herein. For CP-OFDM, the dynamic presence and time and frequency density of PT-RS can be determined at least by one of the configurations of number of front-loaded DMRS symbols, number of additional DMRS symbols and length of TD-OCC for DMRS, and/or CSI-RS. For CP-OFDM, the candidate time and frequency density set of PT-RS can be determined at least by one of the configurations of number of front-loaded DMRS symbols, number of additional DMRS symbols, and length of TD-OCC for DMRS and/or CSI-RS.

For DFT-s-OFDM, the dynamic presence and number of chunks and the size of chunks and time domain density of PT-RS can be determined at least by one of the configurations of number of front-loaded DMRS symbols, number of additional DMRS symbols, and length of TD-OCC for DMRS and/or CSI-RS. For DFT-s-OFDM, the candidate time and number of chunks, the size of chunks and time domain set of PT-RS can be determined at least by one of the configurations of number of front-loaded DMRS symbols, number of additional DMRS symbols and length of TD-OCC for DMRS and/or CSI-RS.

In some aspects, an association table can be pre-defined and/or configured by higher layer signaling and/or recommended by the UE. In some aspects, when collision between the additional DM-RS and PT-RS occurs, at the collided REs, the PT-RS can be punctured. In some aspects, when collision between the additional DM-RS and PT-RS occurs, at the collided REs, the PT-RS can be shifted to neighboring symbols or subcarriers. In some aspects, when collision between the additional DIVI-RS and PT-RS occurs, all the PT-RS can be shifted to neighboring symbols or subcarriers. In some aspects, one or more of the above options can be pre-defined or configured by higher layer signaling or recommended by UE or determined by the number of additional DMRS symbols and/or the density of PT-RS.

In some aspects, the number of chunks and size of chunk for PT-RS for DFT-s-OFDM can be determined by the allocated bandwidth (BW) and/or Modulation and Coding Scheme (MCS) and/or subcarrier spacing (SCS). In some aspects when CP-OFDM waveforms are used, for idle mode, single time/frequency density of PT-RS can be used, which can be pre-defined. In some aspects when DFT-s-OFDM waveforms are used, for idle mode, single number of chunks and/or size of chunk and/or time density of PT-RS can be used, which can be pre-defined.

In some aspects, when additional DM-RS is enabled, the PT-RS can be mapped to the k0 symbol after the front-loaded DM-RS and k1 symbol after the additional DM-RS, where k0 and k1 can be pre-defined or configured by higher layer signaling or DCI or determined based on the density of PT-RS.

In some aspects, for chunk-based PT-RS for DFT-s-OFDM waveforms, the symbol index of each chunk can be determined by the number of DFT points as well as the number of chunks. In some aspects, for chunk-based PT-RS for DFT-s-OFDM waveforms, the symbol index of each chunk can be predefined or configured by higher layer signaling or DCL.

In some aspects, for CP-OFDM waveforms, time domain PT-RS pattern can be every symbol, every other symbol and every 4th symbol, which can be determined by the MCS in a bandwidth part. Table 7 illustrates how the time domain pattern of PT-RS can be determined.

TABLE 7

PT-RS time domain pattern for CP-OFDM

| Scheduled MCS | Time domain density ($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ ptrs-MCS4 | 1 |

In the above table, imcs is the MCS index which can be provided by DCI, and ptrs-MCSi are our various MCS thresholds which can be provided by other configuration signaling such as higher layer signaling (e.g., RRC signaling). The second column in Table 7 is the time domain density of PT-RS.

In some aspects, the frequency domain density of PT-RS can be every 2 resource blocks (RBs) or every 4 RBs, and can be determined based on, e.g., the number of allocated resource block (RBs) (Nrb). Table 8 illustrates how the frequency domain pattern of PT-RS can be determined.

TABLE 8

PT-RS frequency domain pattern for CP-OFDM

| Scheduled bandwidth | Frequency domain density ($K_{PT-RS}$) |
|---|---|
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

In the above table, NRB is the number of allocated resource blocks which can be configured by DCI, and NH resource block number thresholds which can be provided by other configuration signaling such as higher layer signaling (e.g., RRC signaling).

For DFT-s-OFDM, the PT-RS pattern, e.g. number of PT-RS groups, PT-RS group size as shown in FIG. 8 and the time domain pattern, can also be determined by the MCS and allocated bandwidth in a bandwidth part (BWP).

In adaptive Hybrid Automatic Repeat request (HARQ), it is possible that the gNB can indicate to the UE to keep the Transport Block (TB) size with a new modulation order and/or new allocated RB. Then such a group of modulation order and number of RB may not be associated with an MC S defined in the MCS table. More specifically, the gNB can indicate a reserved MCS in DCI, where the reserved MCS only indicates modulation order without indicating a coding scheme. In this case, a redundancy version indicator in DCI can instruct the UE to retransmit uplink data in connection with a HARQ process. Techniques disclosed herein can be used to determine the PT-RS pattern (e.g., PT-RS time domain pattern and PT-RS frequency domain pattern) during such retransmission of uplink data when adaptive HARQ is used.

In some aspects in connection with an adaptive retransmission, the modulation order can be independently indicated by the gNB. The number of RBs can also be changed. In this case, the exact MCS may not be found in the MCS association table (e.g., as provided in the above Tables). The following techniques can be used to determine the PT-RS pattern in retransmission.

In some aspects, N_RB_j can be denoted as the number of RBs in the jth transmission in a HARQ process. In the kth retransmission, for CP-OFDM, the frequency domain pattern can be determined based on one or more of the following options:

Option 1: based on a current number of RBs (e.g., N_RB_k+1) for use in the current (k+1) retransmission;

Option 2: based on the number of RBs in a particular previous transmission, e.g. N_RB_1 (the first or initial transmission of the uplink data) or N_RB_k (the previous re-transmission of the uplink data); and Option 3: based on a function of number of RBs in previous transmission and current transmission, e.g. min{N_RB_1, N_RB_2, . . . , N_RB_k+1} (i.e., the minimum from the number of resource blocks used for all prior transmissions and retransmissions of the uplink data), or max{N_RB_1, N_RB_2, . . . , N_RB_k+1} (i.e., the maximum from the number of resource blocks used for all prior transmissions and retransmissions of the uplink data).

In some aspects, use of one or more of the above options can be pre-defined by the spec or configured by higher layer signaling or DCI.

In some aspects, MCS_j can be denoted as the MCS in the jth transmission in a HARQ process. In the kth retransmission, for CP-OFDM, the frequency domain density of PT-RS can be determined based on one or more of the following options:

Option 1a: based on current MCS (i.e., MCS_k+1) indicated in DCI if the MCS is valid in the MCS association table (e.g., Table 7 above);

Option 1b: based on current MCS estimated according to modulation order, number of RBs and TB size for the current transmission;

Option 2: based on an MCS indicated or estimated in a particular previous transmission, e.g. MCS_1 (the first or initial transmission of the uplink data) or MCS_k (the prior retransmission of the uplink data);

Option 3: based on a function of MCS in one or more previous transmissions and the current transmission, e.g. min{MCS_1, MCS_2, . . . , MCS_k+1}, or max{MCS_1, MCS_2, MCS_k+1};

Option 4: based on the lowest (or highest) MCS with modulation order indicated by adaptive retransmission; and Option 5: based on the predetermined density corresponding to the MCS of the adaptive HARQ.

In some aspects, use of one or more of the above options can be pre-defined by the spec or configured by higher layer signaling or DCI.

In some aspects in connection with option 1b, the MCS can be estimated according to the modulation order and the coding rate in the current transmission. The estimated MCS can be selected from the MCS with the same modulation order. Then the estimated MCS can be indicated as MCS_x or x+1 when the coding rate of MCS_x<current coding rate<coding rate of MCS_x+1.

In some aspects in connection with option 5, there can be one or multiple pre-defined PT-RS patterns for retransmission, the pattern used for the retransmission can be determined by the bandwidth part and/or the redundancy version indicated by the DCI.

In some aspects, when a MCS offset is indicated in the DCI, the MCS used to determine the PT-RS pattern can include the MC S offset as well.

In some aspects associated with DFT-s-OFDM waveforms, the same options above can also be used to determine the number of RBs and MCS, which can be used to determine the number of PT-RS groups, the size of a PT-RS group and/or the time domain density of PT-RS.

In some aspects, when the PT-RS is configured to be used in adaptive retransmission, the UE can expect the gNB to configure the MCS defined in the MCS table, e.g. 0<=MCS<=28. In this aspect, the PT-RS pattern for the retransmission can be determined by the MCS and resource allocation for current slot.

In some aspects, for DL or UL semi-persistent scheduling (SPS) based transmission and uplink grant free transmission, the MCS offset which is used to adjust the MCS to assist the PT-RS pattern selection can be assumed to be 0, and the antenna port of PT-RS can be assumed to be associated with a particular DM-RS antenna port, e.g. with the lowest antenna port index.

In some aspects, a UE can include circuitry to determine the PT-RS in adaptive Hybrid Automatic Repeat request (HARQ) mode. In some aspects, the frequency domain pattern of PT-RS can be determined by the number of resource blocks in the retransmission. In some aspects, the frequency domain pattern of PT-RS can be determined by the number of resource blocks in a previous transmission or a previous retransmission. In some aspects, the frequency domain pattern of PT-RS can be determined by the number of resource blocks used in a sub-set or all previous transmission and a current retransmission. in some aspects, the time domain pattern of PT-RS can be determined by the MCS or estimated MCS in a current retransmission, or in a previous transmission or retransmission. In some aspects, the time domain pattern of PT-RS can be determined by the MCS or estimated MCS in a sub-set of all the previous transmission and a current retransmission. In some aspects, a predefined or configured PT-RS pattern can be used in the retransmission. In some aspects, multiple predefined or configured PT-RS pattern can be used in the retransmission. In some aspects, the PT-RS pattern used a particular retransmission can be determined by the bandwidth part and/or redundancy version indicated by the DCI. In some aspects, when PT-RS is configured to be used, the MCS indication can be the valid MCS in the MCS table. In some aspects, for DL or UL semi-persistent scheduling (SPS) based transmission and uplink grant free transmission, the value of the MCS offset which is used to adjust the MCS to assist the PT-RS pattern selection can be predefined. In some aspects, for UL SPS-based transmission and uplink grant free transmission, the PT-RS antenna port association can be predefined.

Resource Mapping of PT-RS

In some aspects, when CP-OFDM waveforms are used, time domain PT-RS pattern can be every symbol, every other symbol and every 4th symbol, which can be determined by the MCS in a bandwidth part. Additionally, there can be one or two PT-RS antenna ports and one or two codewords indicated in configuration signaling (e.g., DCI) for each transmission. Techniques disclosed herein can be used to determine which MCS is used for determination of the resource mapping pattern of PT-RS.

In some aspects, frequency domain offset of PT-RS including the Resource Element (RE) offset and Resource Block (RB) offset can be determined by UE ID, and/or higher layer control signaling. Techniques disclosed herein can be used to define the frequency offset of PT-RS for different cases triggered by different radio network temporary identifier (RNTI).

In some aspects, Tracking Reference Signal (TRS) can be used for time and frequency offset tracking. Techniques disclosed herein can be used to multiplex the TRS and PT-RS.

MCS Selection for PT-RS Time Domain Pattern

In some aspects, up to two PDSCH codewords (CWs) can be configured for downlink transmissions, and up to one PUSCH codeword can be configured for uplink transmissions, where different codewords can use different MCS. In aspects when DCI configures two codewords, the UE can decode to transmit blocks which can be mapped to different multiple-input-multiple-output (MIMO) layers. In some aspects, the DCI can further indicate PT-RS antenna ports that can be used for PT-RS transmission. In some aspects, the DCI can indicate one or two PT-RS antenna ports, where each PT-RS antenna port can include an association to a DM-RS antenna port.

In some aspects, the PT-RS time domain density (e.g., no transmission, transmission on every symbol, transmission on every other symbol, or transmission on every 4th symbol) can be determined by the MCS and the MCS threshold (which is configured by higher layer signaling). In aspects when DCI configures two codewords, there can be an MCS in each codeword.

Figure 14:
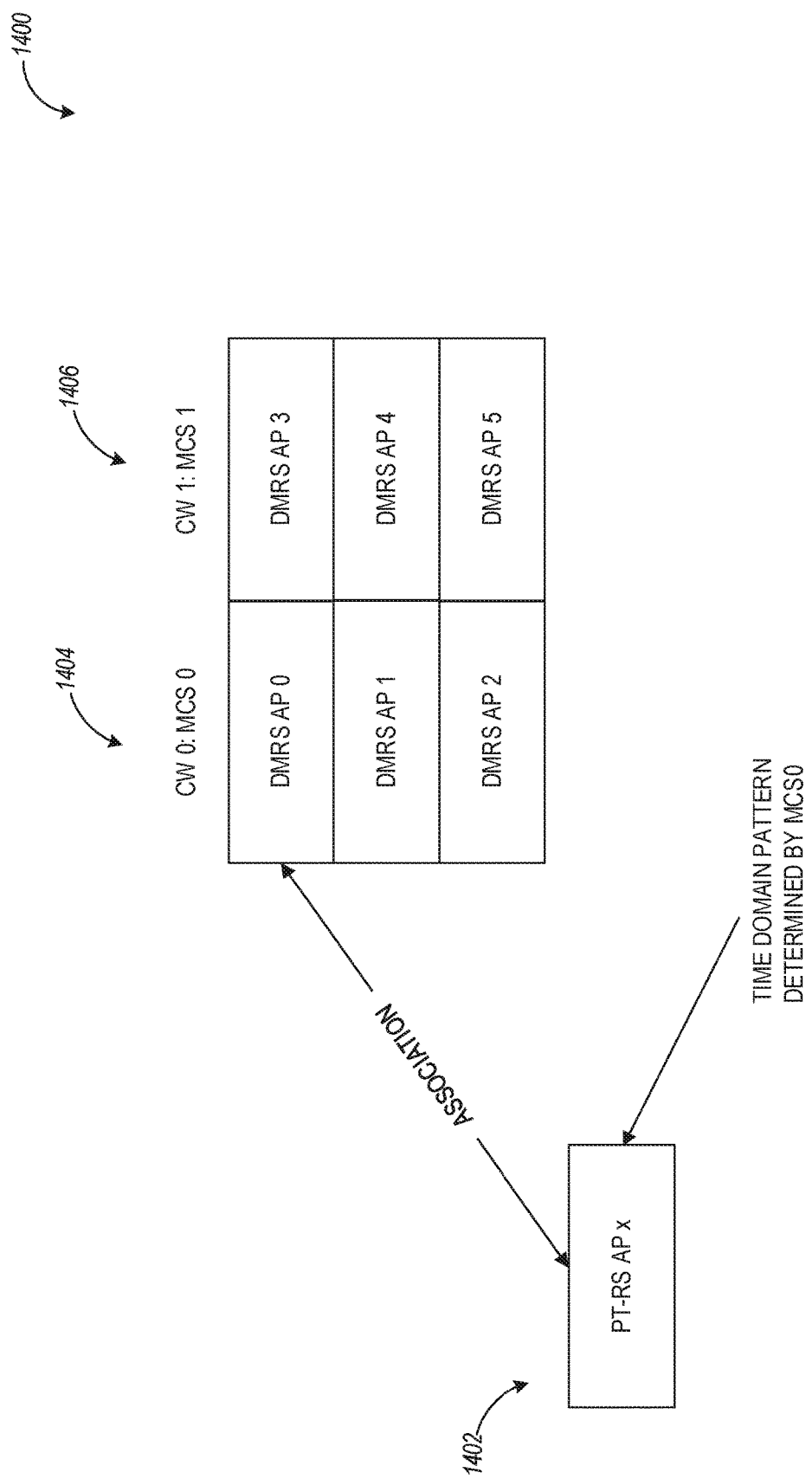
FIG. 14 illustrates example PT-RS time domain pattern determination for two codewords and one PT-RS antenna port, in accordance with some aspects.

FIG. 14 illustrates example PT-RS time domain pattern determination 1400 for two codewords and one PT-RS antenna port, in accordance with some aspects. In some aspects, if one PT-RS antenna port (e.g., 1402) is used together with two codewords (e.g., 1404 and 1406), the PT-RS pattern can be based on the highest MCS (e.g., MCS0), since the codeword with highest MCS includes a DM-RS antenna port associated with the PT-RS. Alternatively, the PT-RS time domain pattern can be determined by the lowest MCS or the average MCS of the two codewords.

Figure 15:
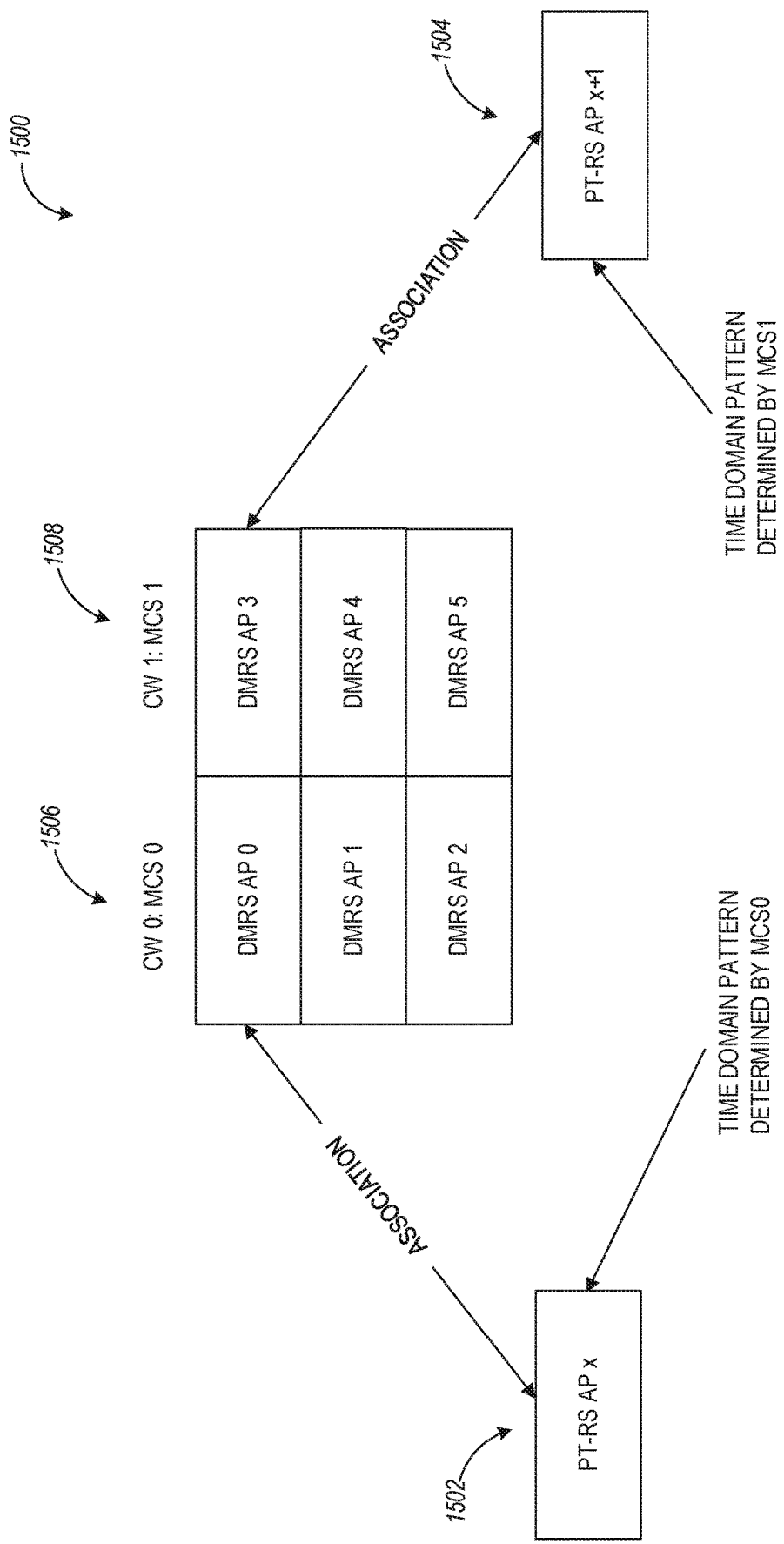
FIG. 15 illustrates example PT-RS time domain pattern determination for two codewords and two PT-RS antenna ports, in accordance with some aspects.
Figure 16:
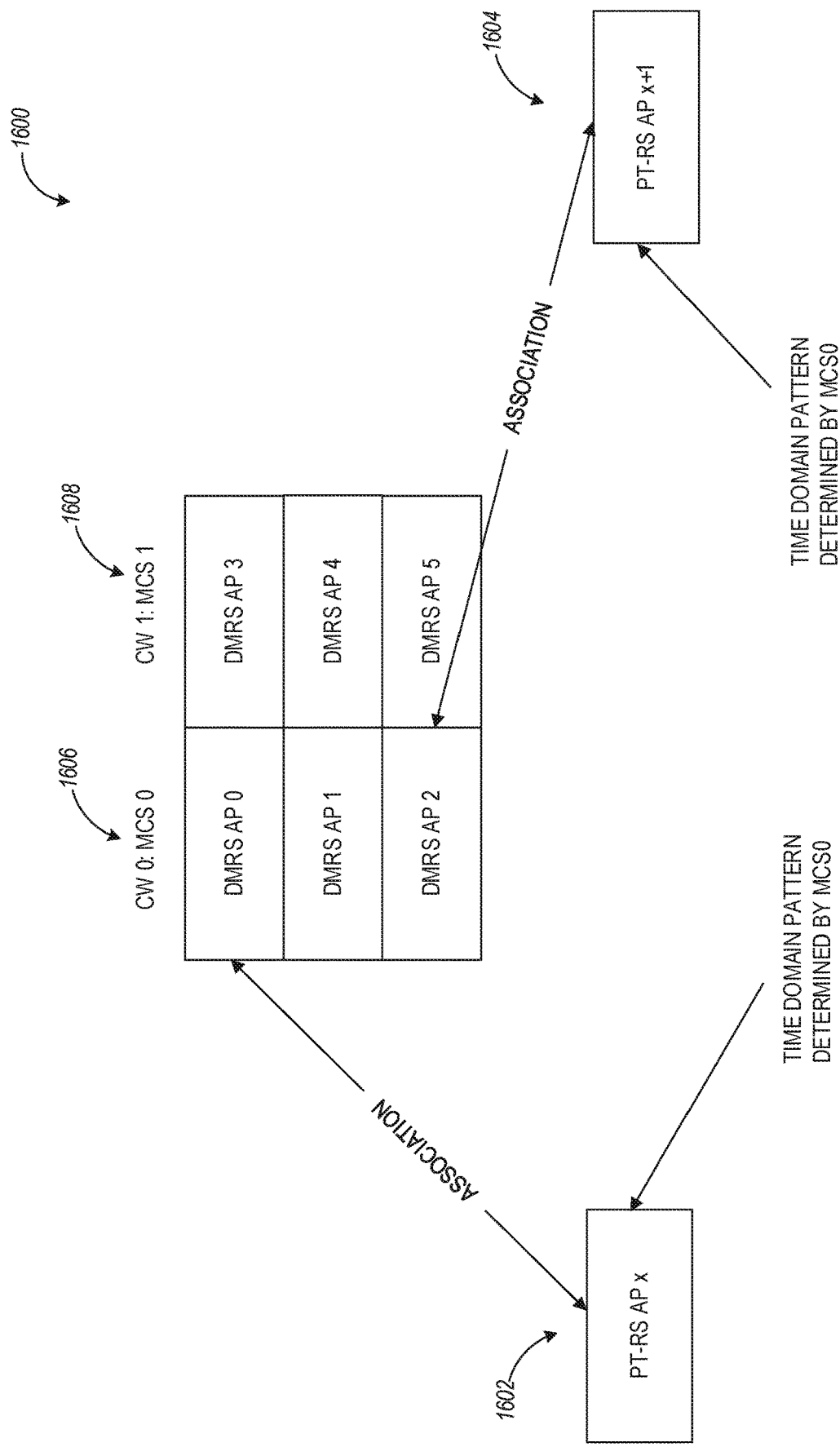
FIG. 16 illustrates example PT-RS time domain pattern determination for two codewords and two PT-RS antenna ports, in accordance with some aspects.

FIG. 15 illustrates example PT-RS time domain pattern determination 1500 for two codewords and two PT-RS antenna ports, in accordance with some aspects. FIG. 16 illustrates example PT-RS time domain pattern determination 1600 for two codewords and two PT-RS antenna ports, in accordance with some aspects.

In another aspect, if two PT-RS antenna ports are used and two codewords are used, the PT-RS pattern of one antenna port can be determined by one of the MCS in the two codewords, which is predefined or determined by the antenna port association between the PT-RS antenna port and the DM-RS antenna port. Alternatively, the PT-RS time domain pattern of one antenna port can be determined by the two MCS, e.g. the maximum or minimal or averaged MCS.

Referring to FIG. 15, PT-RS antenna port 1502 is associated with the DM-RS antenna port 0 for codeword 1506. Therefore, the time domain pattern for transmitting PT-RS via antenna port 1502 can be determined based on MCS0 for codeword 1506. Similarly, PT-RS antenna port 1504 is associated with the DM-RS antenna port 3 for codeword 1508. Therefore, the time domain pattern for transmitting PT-RS via antenna port 1504 can be determined based on MCS1 for codeword 1508.

Referring to FIG. 16, PT-RS antenna port 1602 is associated with the DM-RS antenna port 0 for codeword 1606. Therefore, the time domain pattern for transmitting PT-RS via antenna port 1602 can be determined based on MCS0 for codeword 1606. Similarly, PT-RS antenna port 1604 is associated with the DM-RS antenna port 2 for codeword 1606. Therefore, the time domain pattern for transmitting PT-RS via antenna port 1604 can be determined also based on MCS0 for codeword 1606.

Figure 17:
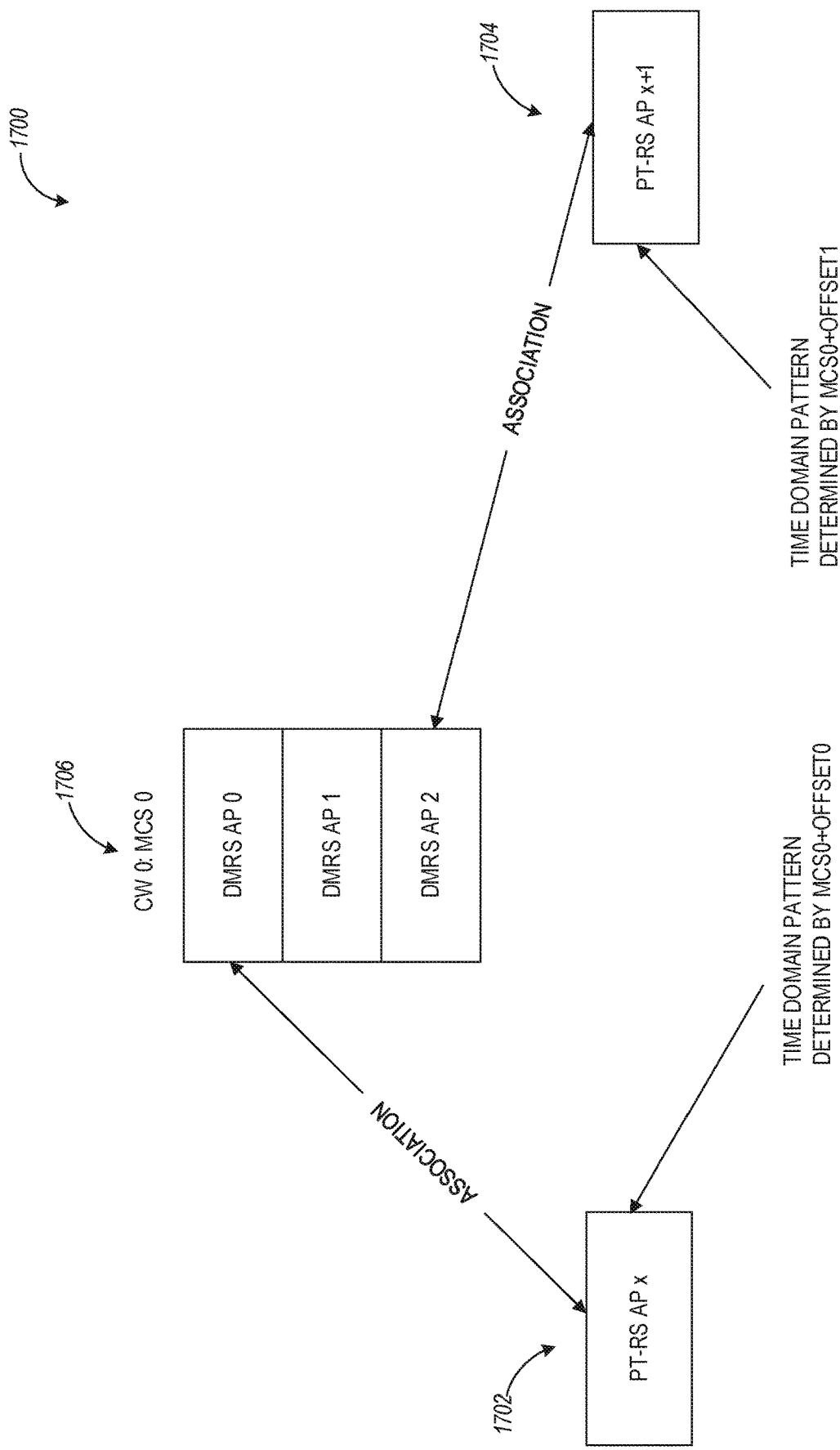
FIG. 17 illustrates example PT-RS time domain pattern determination for a single codewords and two PT-RS antenna ports, in accordance with some aspects.

FIG. 17 illustrates example PT-RS time domain pattern determination 1700 for a single codewords and two PT-RS antenna ports, in accordance with some aspects.

In some aspects, two PT-RS antenna ports can be used (e.g., 1702 and 1704) with a single codeword (e.g., 1706). In this aspect, the PT-RS pattern can be determined by the MCS (e.g., MCS0) of the codeword (e.g., 1706). Alternatively, an MCS offset can be indicated in the DCI for each of the PT-RS antenna ports independently, to, e.g., reflect different SINR in different antenna ports. In aspects when MCS offset is indicated for each PT-RS antenna port (e.g., offset0 and offset1), the time domain pattern for PT-RS can be determined based on MCS0 associated with the codeword and the corresponding offset associated with each PT-RS antenna port.

PT-RS Frequency Domain Offset (e.g., RB Offset) for Different Types of RNTI

In some aspects, the PT-RS RE offset in a RB for PDSCH triggered by a cell specific RNTI (C-RNTI) based PDCCH can be determined based on the C-RNTI. There can be different types of used in a wireless communication system, such as random access RNTI (RA-RNTI), system information RNTI (SI-RNTI), paging RNTI (P-RNTI), multimedia broadcast multicast service (MBMS) RNTI (M-RNTI), and so forth. In some aspects, the PT-RS can be inserted in every other RB or every 4th RB, or another RB offset can be provided (e.g., by DCI or higher layer signaling).

In some aspects, the RE and/or RB offset for the PDSCH triggered by PDCCH with different types of RNTI, e.g. RA-RNTI, SI-RNTI, P-RNTI and M-RNTI, can be determined by the corresponding RNTI or can be fixed (e.g., the first subcarrier as used by the DM-RS, determined based on the virtual cell ID or cell ID, or can be configured by the higher layer signaling). In some aspects, the time domain pattern of PT-RS transmission for the transmission of common control messages can be predefined.

In some aspects associated with connected mode UEs that have been configured with MCS and/or bandwidth threshold to adjust the PT-RS pattern, to receive the signal for other RNTI except the C-RNTI, a default PT-RS threshold defined in a pre-configured association table can be used.

Multiplexing of TRS and PT-RS

Figure 18:
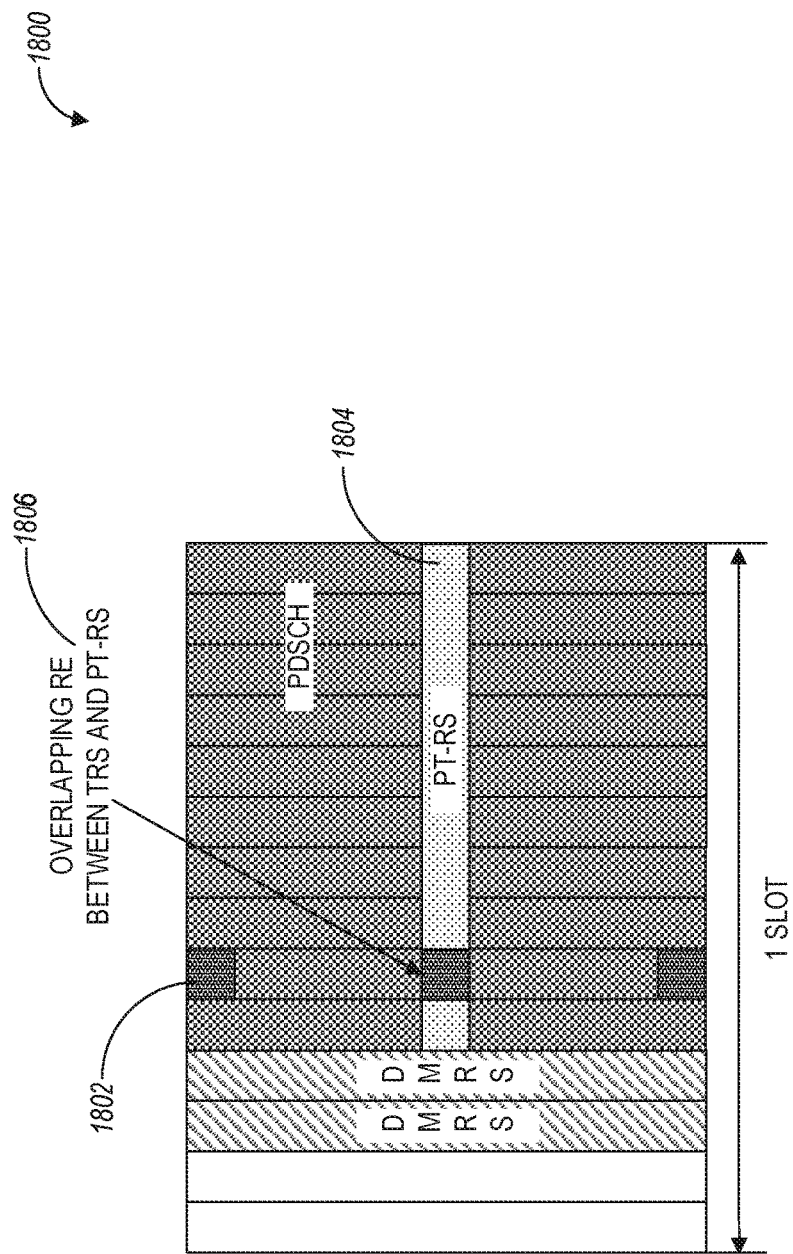
FIG. 18 illustrates an example slot with PT-RS and tracking reference signal (TRS) collision, in accordance with some aspects.

FIG. 18 illustrates an example slot 1800 with PT-RS and tracking reference signal (TRS) collision, in accordance with some aspects. Referring to FIG. 18, slot 1800 can include transmission of PT-RS 1804 subsequent to the DM-RS transmission, as well as transmission of TRS 1802. As illustrated in FIG. 18, RE 1806 can be on overlapping RE between the TRS and the PT-RS data.

In some aspects, the UE may or may not be configured with both multi-slot or multi-symbol based TRS and PT-RS. If the multi-slot and multi-symbol TRS is enabled, the PT-RS may not be used. Alternatively, if the PT-RS is enabled, the multi-slot and multi-symbol TRS may not be configured. Instead, the TRS may only be transmitted in a single slot or in a single symbol.

In another aspect, if collision between TRS and PT-RS occurs, as illustrated in FIG. 18, the PT-RS of the colliding REs may be punctured. Alternatively the colliding subcarrier or the whole TRS can be punctured.

In some aspects, a UE can include circuitry to determine the time and frequency resource mapping pattern for phase tracking reference signal (PT-RS). In some aspects, if one PT-RS antenna port is used and 2 codewords are used, the PT-RS pattern is based on the highest MCS. In some aspects, if one PT-RS antenna port is used and 2 codewords are used, the PT-RS time domain pattern is determined by the lowest MCS or the average MCS of the two codewords. In some aspects, if two PT-RS antenna ports are used and two codewords are used, the PT-RS pattern of one antenna port can be determined by one of the MCS in the two codewords, which is predefined or determined by the antenna port association between the PT-RS antenna port and the DMRS antenna port. In some aspects, if two PT-RS antenna ports are used and two codewords are used, the PT-RS time domain pattern of one antenna port can be determined by the maximum or minimal or averaging MCS from the two MCS for two codewords. In some aspects, if two PT-RS antenna ports are used and a single codeword is used, the PT-RS pattern could be determined by the MCS of this codeword. In some aspects, if two PT-RS antenna ports are used and a single codeword is used, the MCS offset can be indicated in the DCI for each PT-RS antenna port independently or jointly.

In some aspects, the RE and/or RB offset for the PDSCH triggered by PDSCH with different types of RNTI, e.g. RA-RNTI, SI-RNTI, P-RNTI and M-RNTI, is determined by the corresponding RNTI or cell ID or virtual cell ID or it can be fixed. In some aspects, the UE may not be configured with both multi-slot or multi-symbol based TRS and PT-RS. In some aspects, if the multi-slot and multi-symbol TRS is enabled, the PT-RS may not be used. In some aspects, if the PT-RS is enabled, the multi-slot and multi-symbol TRS may not be configured and only single-symbol or single-slot TRS can be used. In some aspects, if collision between TRS and PT-RS occurs, the PT-RS of the colliding REs can be punctured. In some aspects, if collision between TRS and PT-RS occurs, the TRS of the colliding REs or the whole symbol or slot or multi-slot of TRS can be punctured.

Figure 19:
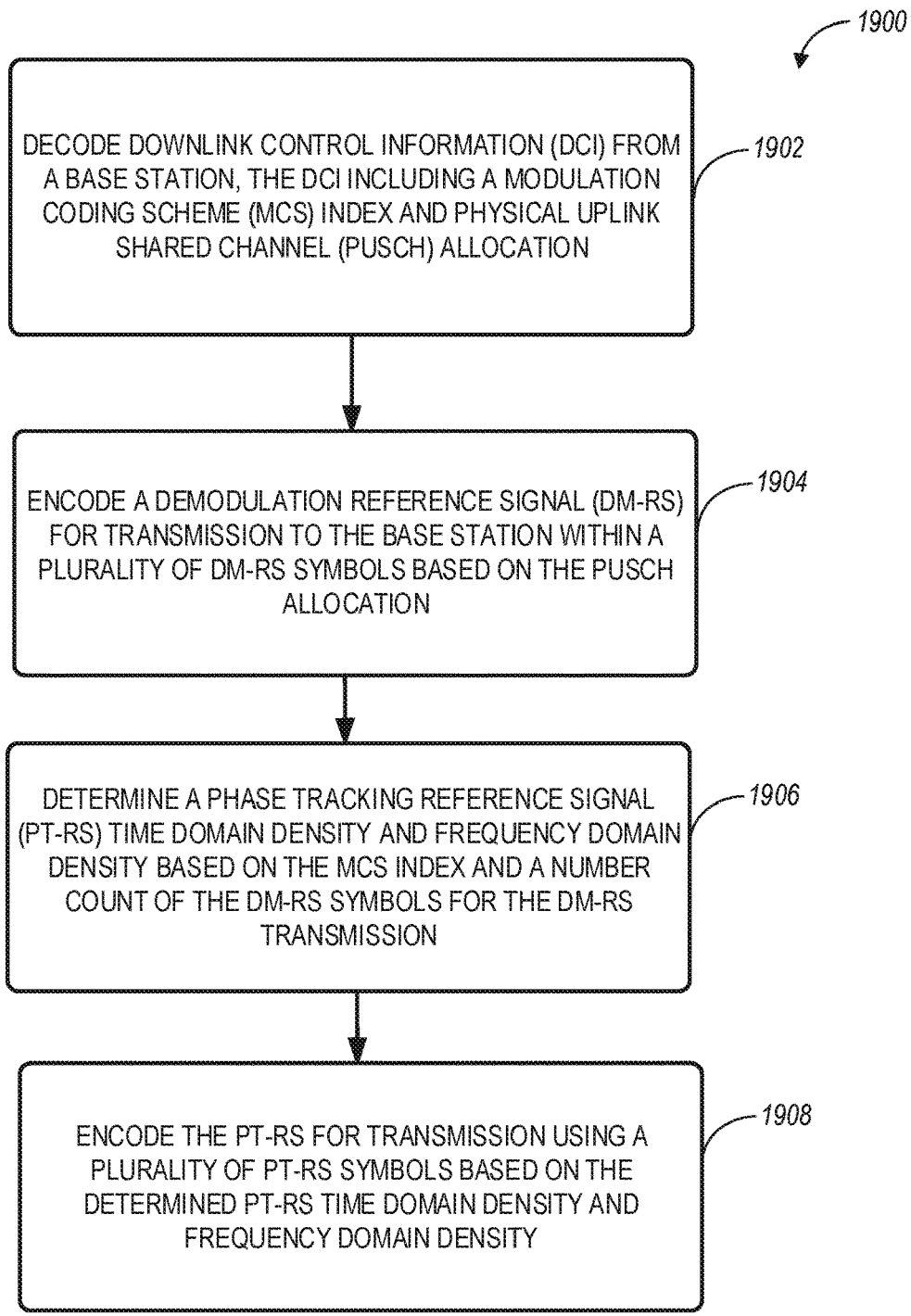
FIG. 19 illustrates generally a flowchart of example functionalities which can be performed in a wireless architecture in connection with PT-RS configuration, in accordance with some aspects.

FIG. 19 illustrates generally a flowchart of example functionalities of a method 1900 which can be performed in a wireless architecture in connection with PT-RS configuration, in accordance with some aspects. Referring to FIG. 19, the method 1900 can start at operation 1902 when downlink control information (DCI) (e.g., 190A) received from a base station (e.g., 111) can be decoded. The DCI (190A) can include a modulation coding scheme (MCS) index and physical uplink shared channel (PDSCH) allocation.

At operation 1904, a demodulation reference signal (DM-RS) (e.g., 904, 906) can be encoded for transmission to the base station within a plurality of DM-RS symbols based on the PUSCH allocation.

At operation 1906, a phase tracking reference signal (PT-RS) time domain density and frequency domain density can be determined based on the MCS index and a number count of the DM-RS symbols for the DM-RS transmission (e.g., the number of symbols used for the transmission of DM-RS 1904 and/or 1906).

At operation 1908, the PT-RS (e.g., 192A and 908-916) can be encoded for transmission using a plurality of PT-RS symbols based on the determined PT-RS time domain density and frequency domain density.

Figure 20:
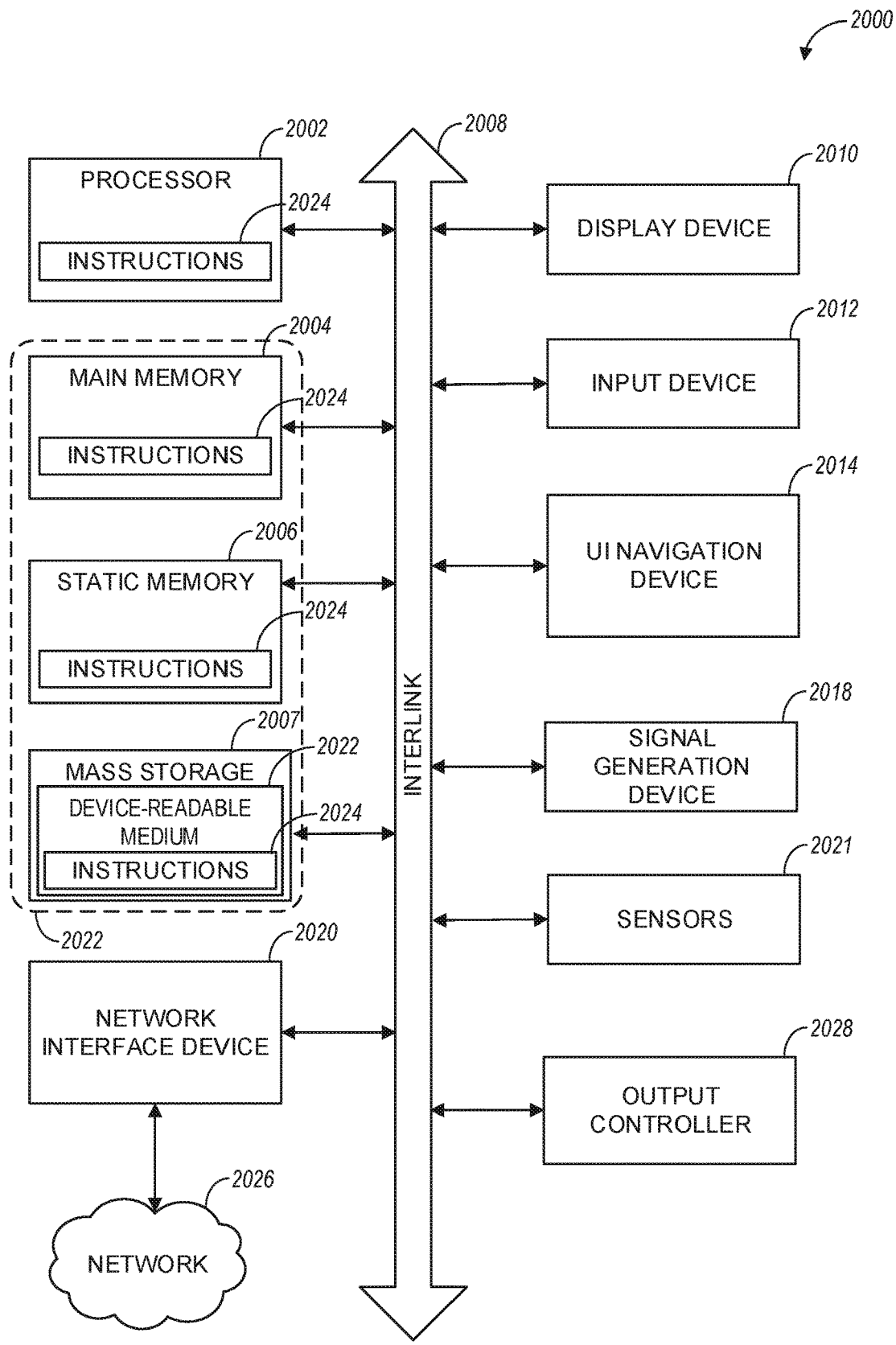
FIG. 20 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 20 illustrates a block diagram of a communication device such as an evolved Node-B (eNB), a next generation Node-B (gNB), an access point (AP), a wireless station (STA), a mobile station (MS), or a user equipment (UE), in accordance with some aspects. In alternative aspects, the communication device 2000 may operate as a standalone device or may be connected (e.g., networked) to other communication devices.

Circuitry (e.g., processing circuitry) is a collection of circuits implemented in tangible entities of the device 2000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 2000 follow.

In some aspects, the device 2000 may operate as a standalone device or may be connected (e.g., networked) to other devices. In a networked deployment, the communication device 2000 may operate in the capacity of a server communication device, a client communication device, or both in server-client network environments. in an example, the communication device 2000 may act as a peer communication device in peer-to-peer (P2P) (or other distributed) network environment. The communication device 2000 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 2000 may include a hardware processor 2002 (e.g., a central processing unit (CPU), a graphics processing unit (GPU), a hardware processor core, or any combination thereof), a main memory 2004, a static memory 2006, and mass storage 2007 (e.g., hard drive, tape drive, flash storage, or other block or storage devices), some or all of which may communicate with each other via an interlink (e.g., bus) 2008.

The communication device 2000 may further include a display device 2010, an alphanumeric input device 2012 (e.g., a keyboard), and a user interface (UI) navigation device 2014 (e.g., a mouse). In an example, the display device 2010, input device 2012 and UI navigation device 2014 may be a touch screen display. The communication device 2000 may additionally include a signal generation device 2018 (e.g., a speaker), a network interface device 2020, and one or more sensors 2021, such as a global positioning system (GPS) sensor, compass, accelerometer, or other sensor. The communication device 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2007 may include a communication device-readable medium 2022, on which is stored one or more sets of data structures or instructions 2024 (e.g., software) embodying or utilized by any one or more of the techniques or functions described herein. In some aspects, registers of the processor 2002, the main memory 2004, the static memory 2006, and/or the mass storage 2007 may be, or include (completely or at least partially), the device-readable medium 2022, on which is stored the one or more sets of data. structures or instructions 2024, embodying or utilized by any one or more of the techniques or functions described herein. In an example, one or any combination of the hardware processor 2002, the main memory 2004, the static memory 2006, or the mass storage 2016 may constitute the device-readable medium 2022.

As used herein, the term "device-readable medium" is interchangeable with "computer-readable medium" or "machine-readable medium". While the communication device-readable medium 2022 is illustrated as a single medium, the term "communication device-readable medium" may include a single medium or multiple media (es., a centralized or distributed database, and/or associated caches and servers) configured to store the one or more instructions 2024.

The term "communication device-readable medium" may include any medium that is capable of storing, encoding, or carrying instructions (e.g., instructions 2024) for execution by the communication device 2000 and that cause the communication device 2000 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 2024 may further be transmitted or received over a communications network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2020 may include one or more physical jacks (e.g., Ethernet, coaxial, or phone jacks) or one or more antennas to connect to the communications network 2026. In an example, the network interface device 2020 may include a plurality of antennas to wirelessly communicate using at least one of single-input multiple-output (SIMO), MIMO, or multiple-input single-output (MISO) techniques. In some examples, the network interface device 2020 may wirelessly communicate using Multiple User MIMO techniques.

The term "transmission medium" shall be taken to include any intangible medium that is capable of storing, encoding or carrying instructions for execution by the communication device 2000, and includes digital or analog communications signals or other intangible medium to facilitate communication of such software. In this regard, a transmission medium in the context of this disclosure is a device-readable medium.

ADDITIONAL NOTES AND EXAMPLES

Example 1 is an apparatus of a user equipment (UE), the apparatus comprising: processing circuitry configured to: decode downlink control information (DCI) from a base station, the DCI including a modulation coding scheme (MCS) index and physical uplink shared channel (PUSCH) allocation; encode a demodulation reference signal (DM-RS) for transmission to the base station within a plurality of DM-RS symbols based on the PUSCH allocation; determine a phase tracking reference signal (PT-RS) time domain density based on the MCS index and a number count of the DM-RS symbols for transmission of the DM-RS; and encode the PT-RS for transmission using a plurality of PT-RS symbols based on the PT-RS time domain density; and memory coupled to the processing circuitry, the memory configured to store the MCS index.

In Example 2, the subject matter of Example 1 includes, wherein the plurality of DM-RS symbols comprises one or both of front-loaded DM-RS symbols and additional DM-RS symbols.

In Example 3, the subject matter of Example 2 includes, wherein the front-loaded DM-RS symbols comprise one or two DM-RS symbols, and the additional DM-RS symbols comprise 0, 1, or 2 DM-RS symbols.

In Example 4, the subject matter of Examples 1-3 includes, wherein the PT-RS time domain density includes no PT-RS symbol transmission, PT-RS symbol transmission on every symbol, PT-RS symbol transmission on every second symbol, or PT-RS symbol transmission on every fourth symbol.

In Example 5, the subject matter of Examples 1-4 includes, wherein the DCI includes physical downlink shared channel (PDSCH) allocation, and the processing circuitry is configured to: decode PT-RS originating from the base station, the PT-RS received with downlink data based on the PDSCH allocation.

In Example 6, the subject matter of Examples 1-5 includes, wherein the processing circuitry is configured to: determine PT-RS frequency domain density or PT-RS chunk size based on the number count of the DM-RS symbols for DM-RS transmission.

In Example 7, the subject matter of Examples 1-6 includes, wherein the DCI further includes an indicator whether a time domain orthogonal cover code (TD-OCC) will be used at the UE, and the processing circuitry is further to: determine one or both of the PT-RS time domain density and PT-RS frequency domain density based on the TD-OCC indicator.

In Example 8, the subject matter of Examples 2-7 includes, wherein the processing circuitry is configured to: determine that at least one of the additional DM-RS symbols will collide with at least one of the PT-RS symbols at a common resource element; and puncture the at least one PT-RS symbol that is determined to collide with the at least one additional DM-RS symbol at the common resource element.

In Example 9, the subject matter of Examples 2-8 includes, wherein the processing circuitry is configured to: determine that at least one of the additional DM-RS symbols will collide with at least one of the PT-RS symbols at a common resource element; and shift the at least one PT-RS symbol that is determined to collide with the at least one additional DM-RS symbol to a neighboring symbol.

In Example 10, the subject matter of Examples 2-9 includes, wherein the processing circuitry is configured to: determine that at least one of the additional DM-RS symbols will collide with at least one of the PT-RS symbols at a common resource element; and re-map the PT-RS symbols for transmission in neighboring symbols.

In Example 11, the subject matter of Examples 1-10 includes, wherein the processing circuitry is configured to: decode control information signaling configuring the DM-RS symbols as front-loaded DM-RS symbols and additional DM-RS symbols for the DM-RS transmission, the control information further including a first PT-RS density indicator and a second PT-RS density indicator; map at least a first PT-RS symbol of the plurality of PT-RS symbols after a first number of symbols subsequent to the front-loaded DM-RS symbols, the first number of symbols based on the first PT-RS density indicator; and map at least a second PT-RS symbol of the plurality of PT-RS symbols after a second number of symbols subsequent to the additional DM-RS symbols, the second number of symbols based on the second PT-RS density indicator.

In Example 12, the subject matter of Examples 1-11 includes, wherein the PT-RS is encoded for transmission via a digital Fourier transform spread orthogonal frequency division multiplexing (DFT-s-OFDM) waveform, and the DCI further includes a starting symbol indicator for chunk-based transmission of the PT-RS symbols.

In Example 13, the subject matter of Examples 1-12 includes, wherein the PT-RS is encoded for transmission via a digital Fourier transform spread orthogonal frequency division multiplexing (DFT-s-OFDM) waveform, and the DCI further configures one or more of the following: a sub-carrier spacing (SCS) threshold, a bandwidth (BW) threshold, and a MCS threshold.

In Example 14, the subject matter of Example 13 includes, wherein the processing circuitry is configured to: determine one or both of a number count of chunks and chunk size for transmitting the PT-RS symbols based on one or more of the following: the configured SCS, BW, and MCS thresholds.

In Example 15, the subject matter of Examples 1-14 includes, wherein processing circuitry is configured to: decode a redundancy version indicator using the DCI, the redundancy version indicator associated with re-transmission of previously transmitted uplink data for a hybrid automatic repeat request (HARQ) process.

In Example 16, the subject matter of Example 15 includes, wherein the MCS index is a reserved MC S index indicating a modulation order without indicating a modulation coding scheme, and wherein processing circuitry is configured to: determine a MCS index used in a prior transmission of the uplink data; determine a time domain PT-RS density for a second PT-RS associated with data re-transmission; and encode the uplink data for re-transmission with the second PT-RS at the determined PT-RS density.

In Example 17, the subject matter of Example 16 includes, wherein processing circuitry is configured to: determine a frequency domain PT-RS density for a second PT-RS based on a number count of resource blocks allocated for the re-transmission; and encode the uplink data for re-transmission with the second PT-RS at the determined frequency domain PT-RS density.

In Example 18, the subject matter of Example 17 includes, wherein processing circuitry is configured to: determine the frequency domain PT-RS density for the second PT-RS based on a number count of resource blocks allocated for a prior transmission of the uplink data.

In Example 19, the subject matter of Examples 16-18 includes, wherein processing circuitry is configured to: determine the time domain PT-RS density for the second PT-RS based on a current MCS index indicated in the DCI.

In Example 20, the subject matter of Examples 16-19 includes, wherein processing circuitry is configured to: determine the time domain PT-RS density for the second PT-RS based on an MCS index associated with an initial transmission of the uplink data.

In Example 21, the subject matter of Examples 16-20 includes, wherein processing circuitry is configured to: determine the time domain PT-RS density for the second PT-RS based on a subset of MCS indices associated with a plurality of prior transmissions of the uplink data.

In Example 22, the subject matter of Examples 1-21 includes, wherein the DCI includes scheduling of at least two physical downlink shared channel (PDSCH) codewords mapped to different multiple-input-multiple-output (MIMO) layers, each of the codeword associated with a corresponding MCS indicator.

In Example 23, the subject matter of Example 22 includes, wherein the processing circuitry is configured to: determine a density pattern for the PT-RS based on the corresponding MCS indicators associated with the at least two PDSCH codewords; and encode the PT-RS for transmission using at least one PT-RS antenna port and based on the determined density pattern.

In Example 24, the subject matter of Example 23 includes, wherein the processing circuitry is configured to: selects a highest MCS indicator of the corresponding MCS indicators; and determine the density pattern based on the highest MCS indicator.

In Example 25, the subject matter of Examples 23-24 includes, wherein the at least one PT-RS antenna port comprises two PT-RS antenna ports indicated by the DCI.

In Example 26, the subject matter of Examples 23-25 includes, wherein the processing circuitry is configured to: selects a lowest MCS indicator of the corresponding MCS indicators; and determine the density pattern based on the lowest MCS indicator.

In Example 27, the subject matter of Examples 22-26 includes, wherein the DCI further indicates two PT-RS antenna ports for PT-RS transmission, each of the PT-RS antenna ports associated with a corresponding DM-RS antenna port for transmitting a DM-RS, and wherein the processing circuitry is configured to: determine a density pattern for the PT-RS based on one of the corresponding MCS indicators associated with the at least two PDSCH codewords, or based on an association between the PT-RS antenna ports and the DM-RS antenna ports; and encode the PT-RS for transmission using one of the two PT-RS antenna port and based on the determined density pattern.

In Example 28, the subject matter of Examples 1-27 includes, wherein the processing circuitry is configured to: decode signaling encoded with a radio network temporary identifier (RNTI); determine a type of the RNTI based on the decoded signaling; and select a pre-defined density as the PT-RS time domain density, the pre-defined density based on the determined type of the RNTI.

In Example 29, the subject matter of Example 28 includes, wherein the processing circuitry is configured to: cease encoding of the PT-RS for transmission based on the type of the RNTI.

In Example 30, the subject matter of Examples 1-29 includes, transceiver circuitry coupled to the processing circuitry; and, one or more antennas coupled to the transceiver circuitry.

Example 31 is an apparatus of a base station, the apparatus comprising: processing circuitry configured to: encode downlink control information (DCI) for transmission to a user equipment (UE), the DCI including a modulation coding scheme (MCS) index and physical uplink shared channel (PUSCH) allocation; decode front-loaded demodulation reference signal (DM-RS) symbols and additional DM-RS symbols received based on the PUSCH allocation; decode a phase tracking reference signal (PT-RS) received with uplink data, the PT-RS having PT-RS density based on the MCS index and a number count of the front-loaded DM-RS symbols and the additional DM-RS symbols; and track phase noise during decoding of the uplink data using the PT-RS; and memory coupled to the processing circuitry, the memory configured to store the MCS index.

In Example 32, the subject matter of Example 31 includes, wherein the front-loaded DM-RS symbols comprise one or two DM-RS symbols, and the additional DM-RS symbols comprise 0, 1, or 2 DM-RS symbols.

In Example 33, the subject matter of Examples 31-32 includes, wherein the PT-RS density includes PT-RS symbol transmission on every symbol, PT-RS symbol transmission on every second symbol, or PT-RS symbol transmission on every fourth symbol.

In Example 34, the subject matter of Examples 31-33 includes, wherein the processing circuitry configured to: encode the DCI to further includes an indicator whether a time domain orthogonal cover code (TD-OCC) will be used at the UE, and wherein the PT-RS density is further based on the TD-OCC indicator.

In Example 35, the subject matter of Examples 31-34 includes, wherein the base station is an evolved Node-B (eNB) or a next generation Node-B (gNB).

In Example 36, the subject matter of Examples 31-35 includes, transceiver circuitry coupled to the processing circuitry; and, one or more antennas coupled to the transceiver circuitry.

Example 37 is a computer-readable storage medium that stores instructions for execution by one or more processors of a user equipment (UE), the instructions to configure the one or more processors to cause the UE to: decode downlink control information (DCI) from a base station, the DCI including a modulation coding scheme (MCS) index and physical uplink shared channel (PUSCH) allocation; encode a demodulation reference signal (DM-RS) for transmission to the base station within a plurality of DM-RS symbols based on the PUSCH allocation; determine a phase tracking reference signal (PT-RS) time domain density and frequency domain density based on the MCS index and a number count of the DM-RS symbols for the DM-RS transmission; and encode the PT-RS for transmission using a plurality of PT-RS symbols based on the PT-RS time domain density and the PT-RS frequency domain density.

In Example 38, the subject matter of Example 37 includes, wherein the plurality of symbols comprises one or both of front-loaded DM-RS symbols and additional DM-RS symbols.

In Example 39, the subject matter of Example 38 includes, wherein the front-loaded DM-RS symbols comprise one or two DM-RS symbols, and the additional DM-RS symbols comprise 0,1, or 2 DM-RS symbols.

In Example 40, the subject matter of Examples 37-39 includes, wherein the PT-RS time domain density includes no PT-RS symbol transmission, PT-RS symbol transmission on every symbol, PT-RS symbol transmission on every second symbol, or PT-RS symbol transmission on every fourth symbol.

In Example 41, the subject matter of Examples 37-40 includes, wherein the PT-RS frequency domain density includes no PT-RS symbol transmission, PT-RS symbol transmission every 2 resource blocks, or PT-RS symbol transmission every 4 resource blocks.

In Example 42, the subject matter of Examples 37-41 includes, wherein the instructions further configure the one or more processors to cause the UE to: determine the PT-RS frequency domain density or PT-RS chunk size based on a number count of the plurality of DM-RS symbols used for the DM-RS transmission.

In Example 43, the subject matter of Examples 37-42 includes, wherein the DCI further includes an indicator whether a time domain orthogonal cover code (TD-OCC) will be used at the UE, and the instructions further configure the one or more processors to cause the UE to: determine one or both of the PT-RS time domain density and the PT-RS frequency domain density based on the TD-OCC indicator.

Example 44 is at least one machine-readable medium including instructions that, when executed by processing circuitry, cause the processing circuitry to perform operations to implement of any of Examples 1-43.

Example 45 is an apparatus comprising means to implement of any of Examples 1-43.

Example 46 is a system to implement of any of Examples 1-43.

Example 47 is a method to implement of any of Examples 1-43.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. in addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus, comprising:
  at least one processor configured to cause a user equipment (UE) to:
    encode a demodulation reference signal (DM-RS) for transmission to a base station within a plurality of DM-RS symbols, wherein the plurality of DM-RS symbols comprises front-loaded DM-RS symbols;
    determine a phase tracking reference signal (PT-RS) time domain density based on a modulation coding scheme (MCS) index;
    encode the PT-RS for transmission using a plurality of PT-RS symbols based on the PT-RS time domain density; and
    map a first PT-RS symbol of the plurality of PT-RS symbols such that the first PT-RS symbol occurs a first number of symbols subsequent to the front-loaded DM-RS symbols, wherein the first number of symbols is based on the PT-RS time domain density.

2. The apparatus of claim 1, wherein the plurality of DM-RS symbols comprises additional DM-RS symbols, and wherein the at least one processor is further configured to cause the UE to:

map a second PT-RS symbol of the plurality of PT-RS symbols such that the second PT-RS symbol occurs a second number of symbols subsequent to the additional DM-RS symbols, wherein the second number of symbols is based on the PT-RS time domain density.

3. The apparatus of claim 1, wherein the PT-RS time domain density is determined based on the MCS index and a number count of the DM-RS symbols for transmission of the DM-RS.

4. The apparatus of claim 3, wherein the at least one processor is further configured to cause the UE to:
   determine that at least one of the additional DM-RS symbols will collide with at least one of the PT-RS symbols at a common resource element; and
   puncture the at least one PT-RS symbol that is determined to collide with the at least one additional DM-RS symbol at the common resource element.

5. The apparatus of claim 3, wherein the at least one processor is further configured to cause the UE to:
   determine that at least one of the additional DM-RS symbols will collide with at least one of the PT-RS symbols at a common resource element; and
   shift the at least one PT-RS symbol that is determined to collide with the at least one additional DM-RS symbol to a neighboring symbol.

6. The apparatus of claim 3, wherein the at least one processor is further configured to cause the UE to:
   determine that at least one of the additional DM-RS symbols will collide with at least one of the PT-RS symbols at a common resource element; and
   re-map the PT-RS symbols for transmission in neighboring symbols.

7. The apparatus of claim 1, wherein the PT-RS is encoded for transmission via a digital Fourier transform spread orthogonal frequency division multiplexing (DFT-s-OFDM) waveform, wherein the at least one processor is further configured to cause the UE to decode downlink control information (DCI) from the base station, and wherein the DCI further configures one or more of the following: a sub-carrier spacing (SCS) threshold, a bandwidth (BW) threshold, and an MCS threshold.

8. The apparatus of claim 7, wherein the at least one processor is further configured to cause the UE to:
   determine one or both of a number count of chunks and chunk size for transmitting the PT-RS symbols based on one or more of the following: the configured SCS threshold, the configured BW threshold, and the configured MCS threshold.

9. The apparatus of claim 1, wherein the at least one processor is further configured to cause the UE to:
   decode downlink control information (DCI) from the base station; and
   decode a redundancy version indicator using the DCI, wherein the redundancy version indicator is associated with re-transmission of previously transmitted uplink data for a hybrid automatic repeat request (HARD) process.

10. The apparatus of claim 9, wherein the MCS index is a reserved MCS index indicating a modulation order without indicating a modulation coding scheme, and wherein the at least one processor is further configured to cause the UE to:
   determine an MCS index used in a prior transmission of the uplink data;
   determine a second time domain PT-RS density for a second PT-RS associated with data re-transmission; and
   encode the uplink data for re-transmission with the second PT-RS at the determined second PT-RS density.

11. The apparatus of claim 1, wherein the at least one processor is further configured to decode downlink control information (DCI) from the base station, and wherein the DCI includes scheduling of at least two physical downlink shared channel (PDSCH) codewords mapped to different multiple-input-multiple-output (MIMO) layers, wherein each of the at least two PDSCH codewords is associated with a corresponding MCS indicator.

12. The apparatus of claim 11, wherein the at least one processor is further configured to cause the UE to:
   determine a density pattern for the PT-RS based on the corresponding MCS indicators associated with the at least two PDSCH codewords; and
   encode the PT-RS for transmission using at least one PT-RS antenna port and based on the determined density pattern.

13. The apparatus of claim 12, wherein the at least one processor is further configured to cause the UE to:
   select an extreme valued MCS indicator of the corresponding MCS indicators; and
   determine the density pattern based on the extreme-valued MCS indicator.

14. The apparatus of claim 11, wherein the at least one processor is further configured to cause the UE to decode downlink control information (DCI) from the base station, wherein the DCI further indicates two PT-RS antenna ports for PT-RS transmission, wherein each of the PT-RS antenna ports is associated with a corresponding DM-RS antenna port for transmitting a DM-RS, and wherein the at least one processor is further configured to cause the UE to:
   determine a density pattern for the PT-RS based on one of the corresponding MCS indicators associated with the at least two PDSCH codewords, or based on an association between the PT-RS antenna ports and the DM-RS antenna ports; and
   encode the PT-RS for transmission using one of the two PT-RS antenna port and based on the determined density pattern.

15. An apparatus, comprising:
   at least one processor configured to cause a base station to:
      decode front-loaded demodulation reference signal (DM-RS) symbols and additional DM-RS symbols received, wherein the plurality of DM-RS symbols comprises front-loaded DM-RS symbols; and
      decode a phase tracking reference signal (PT-RS) received, wherein the PT-RS has a PT-RS time domain density in accordance with a modulation coding scheme (MCS), wherein a first PT-RS symbol occurs a first number of symbols subsequent to the front-loaded DM-RS symbols, wherein the first number of symbols is based on the PT-RS time domain density.

16. The apparatus of claim 15, wherein the PT-RS density indicates PT-RS symbol reception on every symbol, or PT-RS symbol reception on every second symbol, or PT-RS symbol reception on every fourth symbol.

17. The apparatus of claim 15, wherein the at least one processor is further configured to cause the base station to:
   encode downlink control information (DCI) to further include an indicator that indicates whether a time domain orthogonal cover code (TD-OCC) will be used at the UE, and wherein the PT-RS density is further based on the TD-OCC indicator.

18. A non-transitory computer-readable storage medium storing program instructions for execution by one or more processors of a user equipment (UE), wherein the program instructions, when executed by the one or more processors, cause the UE to:
  encode a demodulation reference signal (DM-RS) for transmission to thea base station within a plurality of DM-RS symbols, wherein the plurality of DM-RS symbols comprises front-loaded DM-RS symbols;
  determine a phase tracking reference signal (PT-RS) symbol time domain position based on a modulation coding scheme (MCS) index and a position of the DM-RS symbols for transmission of the DM-RS; and
  encode the PT-RS for transmission using a plurality of PT-RS symbols based on the determined PT-RS symbol time domain position.

19. The non-transitory computer-readable storage medium of claim 18, wherein the program instructions, when executed by the one or more processors, further cause the UE to:
  determine a PT-RS time domain density based on the MCS index; and
  map a first PT-RS symbol of the plurality of PT-RS symbols so that the first PT-RS symbol occurs a first number of symbols subsequent to the front-loaded DM-RS symbols, wherein the first number of symbols is based on the PT-RS time domain density.

20. The non-transitory computer-readable storage medium of claim 18, wherein the plurality of DM-RS symbols comprises additional DM-RS symbols, wherein the program instructions, when executed by the one or more processors, further cause the UE to:
  map a second PT-RS symbol of the plurality of PT-RS symbols so that the second PT-RS symbol occurs a second number of symbols subsequent to the additional DM-RS symbols, wherein the second number of symbols is based on the PT-RS time domain density.

* * * * *

UNITED STATES PATENT AND TRADEMARK OFFICE
CERTIFICATE OF CORRECTION

PATENT NO. : 11,641,299 B2
APPLICATION NO. : 16/645360
DATED : May 2, 2023
INVENTOR(S) : Alexei Vladimirovich Davydov et al.

It is certified that error appears in the above-identified patent and that said Letters Patent is hereby corrected as shown below:

In the Claims

Column 45, Line 57, delete "(HARD)" and insert --(HARQ)--.

Column 46, Line 52, delete "(MCS)," and insert --(MCS) index,--.

Column 47, Line 7, delete "thea" and insert --the a--.

Signed and Sealed this
Twenty-fourth Day of October, 2023

Katherine Kelly Vidal
*Director of the United States Patent and Trademark Office*